US012589493B2

(12) United States Patent
Sogi et al.

(10) Patent No.: US 12,589,493 B2
(45) Date of Patent: Mar. 31, 2026

(54) INFORMATION PROCESSING APPARATUS AND STORAGE MEDIUM

(71) Applicant: NEC Corporation, Tokyo (JP)

(72) Inventors: Naoya Sogi, Tokyo (JP); Makoto Terao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 201 days.

(21) Appl. No.: 18/388,561

(22) Filed: Nov. 10, 2023

(65) Prior Publication Data

US 2024/0157551 A1    May 16, 2024

(30) Foreign Application Priority Data

Nov. 14, 2022    (JP) ................................. 2022-182126

(51) Int. Cl.
B25J 9/16    (2006.01)
(52) U.S. Cl.
CPC .............. B25J 9/163 (2013.01); *B25J 9/1664* (2013.01)
(58) Field of Classification Search
CPC ................................ B25J 9/163; B25J 9/1664
See application file for complete search history.

(56) References Cited

U.S. PATENT DOCUMENTS

| | | | | |
|---|---|---|---|---|
| 11,571,809 | B1* | 2/2023 | Bodnar .................. | B25J 9/1612 |
| 2021/0078167 | A1* | 3/2021 | Khansari Zadeh .. | B25J 15/0028 |
| 2022/0184806 | A1* | 6/2022 | Chen ..................... | B25J 9/1697 |
| 2022/0203535 | A1* | 6/2022 | Bai ........................ | B25J 9/1671 |
| 2023/0036849 | A1* | 2/2023 | Lu .......................... | E02F 9/262 |

| | | | | |
|---|---|---|---|---|
| 2023/0158667 | A1* | 5/2023 | Urata ..................... | G06N 20/00 |
| | | | | 700/246 |
| 2023/0191605 | A1* | 6/2023 | Handa ................... | B25J 9/1689 |
| | | | | 700/257 |
| 2024/0054393 | A1* | 2/2024 | Tanaka .................... | B25J 9/163 |

FOREIGN PATENT DOCUMENTS

| | | |
|---|---|---|
| JP | 2018-202550 A | 12/2018 |
| JP | 2021-077345 A | 5/2021 |
| WO | 2019/146007 A1 | 8/2019 |

OTHER PUBLICATIONS

Levine, Sergey, et al., "Learning hand-eye coordination for robotic grasping with deep learning and large-scale data collection", The International journal of robotics research 37.4-5 (2018): 421-436.

* cited by examiner

*Primary Examiner* — Harry Y Oh
*Assistant Examiner* — Karston G. Evans
(74) *Attorney, Agent, or Firm* — Sughrue Mion, PLLC

(57)    ABSTRACT

Provided is a technique that makes it possible, as evaluation of a control plan with respect to a control target, to evaluate a plan sequence while taking into consideration long-term influence. An information processing apparatus includes: an acquisition section that acquires state information and a plan sequence, the state information indicating a state of at least one of a control target and an environment, and the plan sequence being a time series of control plans with respect to the control target; a generation section that generates a state sequence using output obtained by inputting the state information and the plan sequence into a learned model, the state sequence being a time series of pieces of state information each indicating a predicted future state; and a calculation section that calculates, using the state sequence, a success probability of the plan sequence which has been acquired by the acquisition section.

20 Claims, 17 Drawing Sheets

Figure 2:
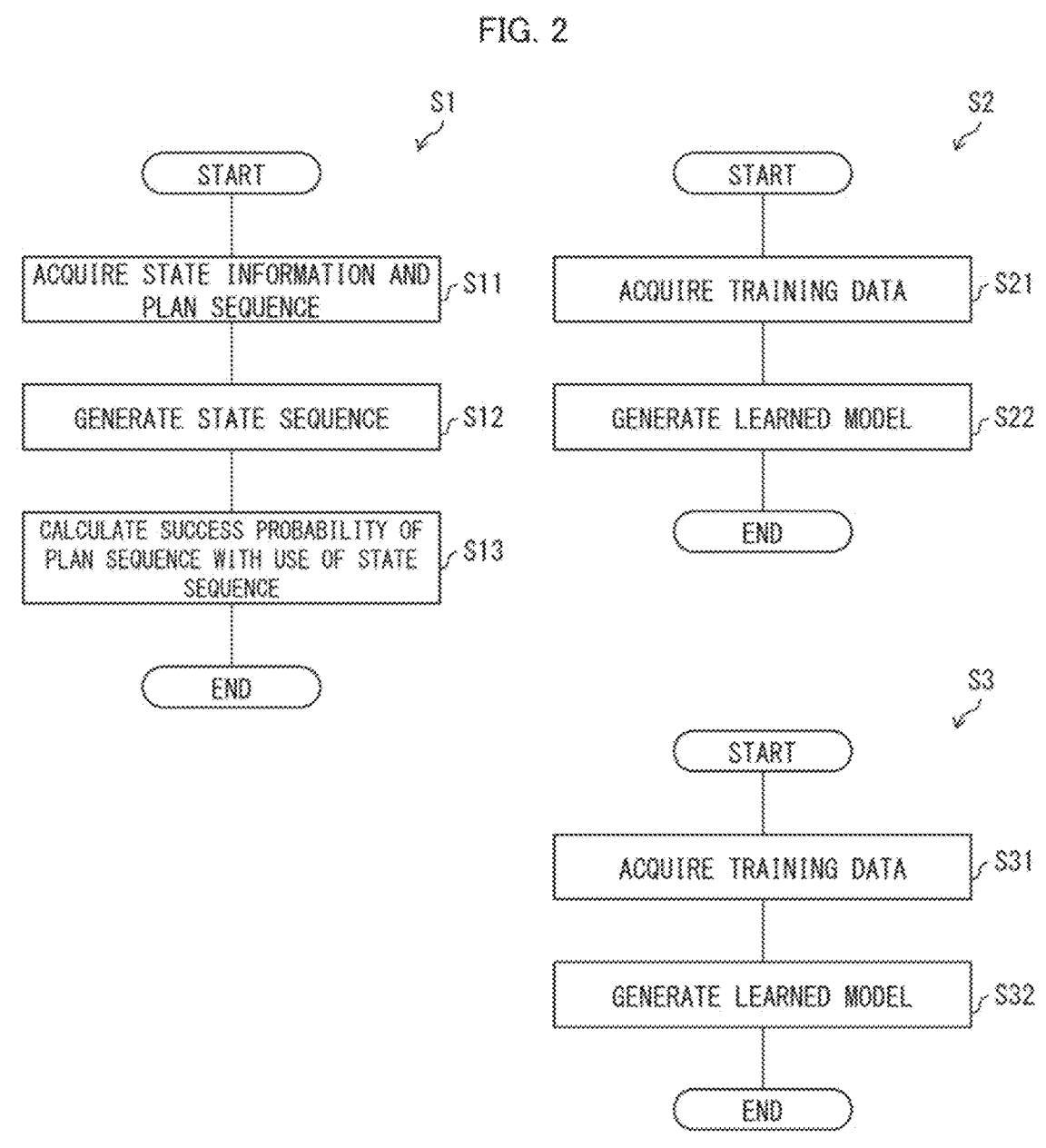

START

ACQUIRE STATE INFORMATION AND PLAN SEQUENCE ⌐S11

GENERATE STATE SEQUENCE ⌐S12

CALCULATE SUCCESS PROBABILITY OF PLAN SEQUENCE WITH USE OF STATE SEQUENCE ⌐S13

END

S2

START

ACQUIRE TRAINING DATA ⌐S21

GENERATE LEARNED MODEL ⌐S22

END

S3

START

ACQUIRE TRAINING DATA ⌐S31

GENERATE LEARNED MODEL ⌐S32

END

Grasp A

Place at X

Grasp B $b_1$ $b_2$ $b_3$

PLAN SEQUENCE

SUCCESS

SUCCESS

FAILURE $J_0$ $J_1$ $J_2$

C1

PROCESSOR

C2

C

MEMORY

P

PROGRAM

COMPUTER

M rb

INFORMATION PROCESSING APPARATUS AND STORAGE MEDIUM

This Nonprovisional application claims priority under 35 U.S.C. § 119 on Patent Application No. 2022-182126 filed in Japan on Nov. 14, 2022, the entire contents of which are hereby incorporated by reference.

TECHNICAL FIELD

The present invention relates to a technique for generating a control plan with respect to a control target.

BACKGROUND ART

A technique has been proposed in which a plan of carrying out a complicated and long-term task with a robot arm is generated using task and motion planning (TAMP) and optimal control. In such a technique, it is necessary to design constraint conditions manually in order to increase a success rate of the plan. However, it is difficult to cover all necessary constraint conditions, and there are cases where an infeasible plan is made due to insufficient constraint conditions. Under the circumstances, as a technique for generating a draft plan without designing constraint conditions, for example, Non-patent Literature 1 indicates that: among a plurality of randomly sampled input values to a robot motor, an input value is employed which increases an output value (i.e., a success probability of a plan) of a neural network when that input value is input into the neural network together with an initial image and a current image; and by repeating this operation, an action of a robot is carried out.

CITATION LIST

Non-Patent Literature

Non-patent Literature 1

Levine, Sergey, et al., "Learning hand-eye coordination for robotic grasping with deep learning and large-scale data collection", The International journal of robotics research 37.4-5 (2018): 421-436

SUMMARY OF INVENTION

Technical Problem

However, there is a problem in the technique disclosed in Non-patent Literature 1 that only information (current image) for a single time is considered and long-term influence cannot be considered.

An example aspect of the present invention is accomplished in view of the above problem, and an example object thereof is to provide a technique that makes it possible, as evaluation of a control plan with respect to a control target, to evaluate a plan sequence while taking into consideration long-term influence.

Solution to Problem

An information processing apparatus in accordance with an example aspect of the present invention includes at least one processor, the at least one processor carrying out: an acquisition process of acquiring state information and a plan sequence, the state information indicating a state of at least one selected from the group consisting of a control target and an environment, and the plan sequence being a time series of control plans with respect to the control target; a generation process of generating a state sequence with use of output obtained by inputting the state information and the plan sequence into a learned model, the state sequence being a time series of pieces of state information each indicating a predicted future state; and a calculation process of calculating, with use of the state sequence, a success probability of the plan sequence which has been acquired in the acquisition process.

An information processing apparatus in accordance with an example aspect of the present invention includes at least one processor, the at least one processor carrying out: an acquisition process of acquiring training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and a generation process of generating a learned model by supervised learning using the training data, the learned model outputting a success probability of a plan sequence which is a time series of control plans with respect to a control target.

An information processing apparatus in accordance with an example aspect of the present invention includes at least one processor, the at least one processor carrying out: an acquisition process of acquiring training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and a generation process of generating a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

Advantageous Effects of Invention

According to an example aspect of the present invention, as evaluation of a control plan with respect to a control target, it is possible to evaluate a plan sequence while taking into consideration long-term influence.

BRIEF DESCRIPTION OF DRAWINGS

FIG. 2 is a flowchart illustrating a flow of an information processing method in accordance with the first example embodiment.

FIG. 3 is a diagram for schematically illustrating a plan sequence evaluation process which is carried out by an information processing apparatus in accordance with a second example embodiment.

FIG. 15 is a diagram illustrating a specific example of training data in accordance with the third example embodiment.

EXAMPLE EMBODIMENTS

First Example Embodiment

The following description will discuss a first example embodiment of the present invention in detail, with reference to the drawings. The present example embodiment is a basic form of example embodiments described later.
(Configuration of Information Processing Apparatus)

Figure 1:
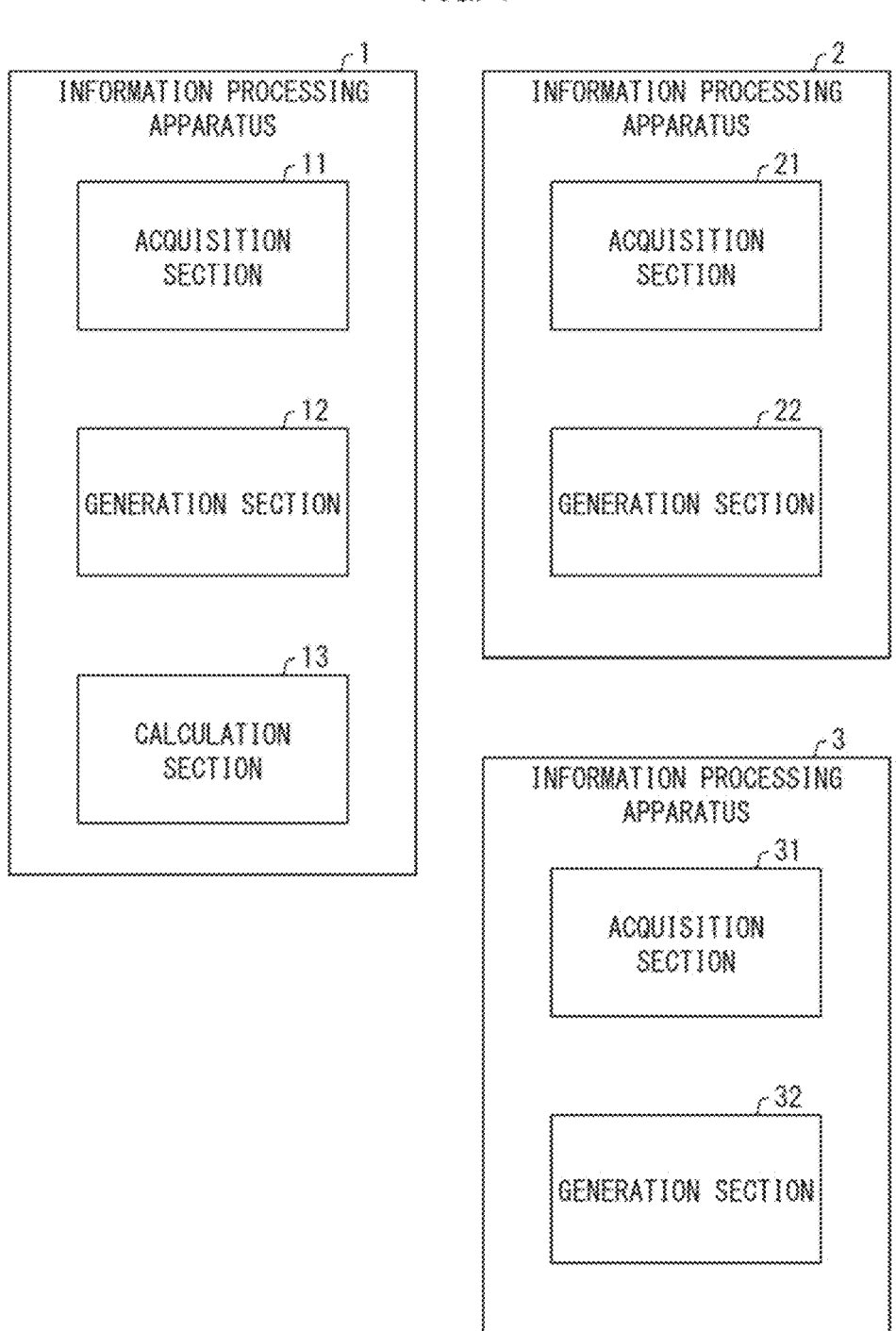
FIG. 1 is a block diagram illustrating a configuration of an information processing apparatus in accordance with a first example embodiment.

The following description will discuss a configuration of an information processing apparatus 1 in accordance with the present example embodiment, with reference to FIG. 1. FIG. 1 is a block diagram illustrating a configuration of an information processing apparatus 1. The information processing apparatus 1 includes an acquisition section 11 (acquisition means), a generation section 12 (generation means), and a calculation section 13 (calculation means).

The acquisition section 11 acquires state information and a plan sequence, the state information indicating a state of at least one selected from the group consisting of a control target and an environment, and the plan sequence being a time series of control plans with respect to the control target. The acquisition section 11 may acquire state information and a plan sequence which are input via an input-output apparatus, or may acquire state information and a plan sequence from a storage location (that may be in a storage apparatus of the information processing apparatus 1 or may be a storage apparatus outside the information processing apparatus 1) designated by a user of the information processing apparatus 1.

The generation section 12 generates a state sequence with use of output obtained by inputting the state information and the plan sequence into a learned model, the state sequence being a time series of pieces of state information each indicating a predicted future state. The calculation section 13 calculates, with use of the state sequence, a success probability of the plan sequence which has been acquired by the acquisition section 11.

As described above, the information processing apparatus 1 in accordance with the present example embodiment employs the configuration of including: the acquisition section 11 that acquires state information and a plan sequence, the state information indicating a state of at least one selected from the group consisting of a control target and an environment, and the plan sequence being a time series of control plans with respect to the control target; the generation section 12 that generates a state sequence with use of output obtained by inputting the state information and the plan sequence into a learned model, the state sequence being a time series of pieces of state information each indicating a predicted future state; and the calculation section 13 that calculates, with use of the state sequence, a success probability of the plan sequence which has been acquired by the acquisition section 11. A success probability calculated by the calculation section 13 can also be regarded as an index for evaluating a plan sequence. That is, according to the information processing apparatus 1 in accordance with the present example embodiment, it is possible to bring about an example advantage of, as evaluation of a control plan with respect to a control target, evaluating a plan sequence while taking into consideration long-term influence.
(Program)

The foregoing functions of the information processing apparatus 1 can also be implemented by a program. A program in accordance with the present example embodiment is a program for causing a computer to carry out: a process of acquiring state information and a plan sequence, the state information indicating a state of at least one selected from the group consisting of a control target and an environment, and the plan sequence being a time series of control plans with respect to the control target; a process of generating a state sequence with use of output obtained by inputting the state information and the plan sequence into a learned model, the state sequence being a time series of pieces of state information each indicating a predicted future state; and a process of calculating, with use of the state sequence, a success probability of the plan sequence. According to the program, it is possible to bring about an example advantage of, as evaluation of a control plan with respect to a control target, evaluating a plan sequence while taking into consideration long-term influence.

(Flow of Information Processing Method)

The following description will discuss a flow of an information processing method S1 in accordance with the present example embodiment, with reference to FIG. 2. FIG. 2 is a flowchart illustrating the flow of the information processing method S1. Note that an execution subject of steps in the information processing method S1 may be a processor included in the information processing apparatus 1 or may be a processor included in another apparatus.

In S11, at least one processor acquires state information and a plan sequence, the state information indicating a state of at least one selected from the group consisting of a control target and an environment, and the plan sequence being a time series of control plans with respect to the control target. In S12, the at least one processor generates a state sequence with use of output obtained by inputting the state information and the plan sequence into a learned model, the state sequence being a time series of pieces of state information each indicating a predicted future state. In S13, the at least one processor calculates, with use of the state sequence, a success probability of the plan sequence.

As described above, the information processing method S1 in accordance with the present example embodiment includes: acquiring, by at least one processor, state information and a plan sequence, the state information indicating a state of at least one selected from the group consisting of a control target and an environment, and the plan sequence being a time series of control plans with respect to the control target; generating, by the at least one processor, a state sequence with use of output obtained by inputting the state information and the plan sequence into a learned model, the state sequence being a time series of pieces of state information each indicating a predicted future state; and calculating, by the at least one processor, a success probability of the plan sequence with use of the state sequence. Therefore, According to the information processing method S1 in accordance with the present example embodiment, it is possible to bring about an example advantage of, as evaluation of a control plan with respect to a control target, evaluating a plan sequence while taking into consideration long-term influence.

(Configuration of Information Processing Apparatus)

The following description will discuss a configuration of an information processing apparatus 2 in accordance with the present example embodiment, with reference to FIG. 1. The information processing apparatus 2 includes an acquisition section 21 (acquisition means) and a generation section 22 (generation means).

The acquisition section 21 acquires training data. The training data includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence. The acquisition section 21 may acquire training data which is input via an input-output apparatus, or may acquire training data from a storage location (that may be in a storage apparatus of the information processing apparatus 2 or may be a storage apparatus outside the information processing apparatus 2) designated by a user of the information processing apparatus 2.

The generation section 22 generates a learned model by supervised learning using the training data. The learned model is a model that outputs a success probability of a plan sequence which is a time series of control plans with respect to a control target.

As described above, the information processing apparatus 2 in accordance with the present example embodiment employs the configuration of including: the acquisition section 21 that acquires training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and the generation section 22 that generates a learned model by supervised learning using the training data, the learned model outputting a success probability of a plan sequence which is a time series of control plans with respect to a control target. By using a learned model generated by the information processing apparatus 2 in accordance with the present example embodiment, it is possible to bring about an example advantage of, as evaluation of a control plan with respect to a control target, evaluating a plan sequence while taking into consideration long-term influence.

(Program)

The foregoing functions of the information processing apparatus 2 can also be implemented by a program. A program in accordance with the present example embodiment is a program for causing a computer to carry out: a process of acquiring training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and a process of generating a learned model by supervised learning using the training data, the learned model outputting a success probability of a plan sequence which is a time series of control plans with respect to a control target. By using a learned model generated by the program, it is possible to bring about an example advantage of, as evaluation of a control plan with respect to a control target, evaluating a plan sequence while taking into consideration long-term influence.

(Flow of Information Processing Method)

The following description will discuss a flow of an information processing method S2 in accordance with the present example embodiment, with reference to FIG. 2. Note that an execution subject of steps in the information processing method S2 may be a processor included in the information processing apparatus 2 or may be a processor included in another apparatus.

In S21, at least one processor acquires training data. The training data includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence.

In S22, the at least one processor generates a learned model by supervised learning using the training data. The learned model is a model that outputs a success probability of a plan sequence which is a time series of control plans with respect to a control target.

As described above, the information processing method S2 in accordance with the present example embodiment includes: acquiring, by at least one processor, training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and generating, by the at least one processor, a learned model by supervised learning using the training data, the learned model outputting a success probability of a plan sequence which is a time series of control plans with respect to a control target. By using a learned model generated by the information processing method S2 in accordance with the present example embodiment, it is possible to bring about an example advantage of, as evaluation of a control plan with respect to a control target, evaluating a plan sequence while taking into consideration long-term influence.

(Configuration of Information Processing Apparatus)

The following description will discuss a configuration of an information processing apparatus 3 in accordance with the present example embodiment, with reference to FIG. 1. The information processing apparatus 3 includes an acquisition section 31 (acquisition means) and a generation section 32 (generation means).

The acquisition section 31 acquires training data. The training data includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence. The acquisition section 31 may acquire training data which is input via an input-output apparatus, or may acquire training data from a storage location (that may be in a storage apparatus of the information processing apparatus 3 or may be a storage apparatus outside the information processing apparatus 3) designated by a user of the information processing apparatus 3.

The generation section 32 generates a learned model by supervised learning using the training data. The learned model is a model that outputs fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

As described above, the information processing apparatus 3 in accordance with the present example embodiment employs the configuration of including: the acquisition section 31 that acquires training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and the generation section 32 that generates a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target. By using a learned model generated by the information processing apparatus 3 in accordance with the present example embodiment, it is possible to bring about an example advantage of, as evaluation of a control plan with respect to a control target, evaluating a plan sequence while taking into consideration long-term influence.

(Program)

The foregoing functions of the information processing apparatus 3 can also be implemented by a program. A program in accordance with the present example embodiment is a program for causing a computer to carry out: a process of acquiring training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and a process of generating a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target. By using a learned model generated by the program, it is possible to bring about an example advantage of, as evaluation of a control plan with respect to a control target, evaluating a plan sequence while taking into consideration long-term influence.

(Flow of Information Processing Method)

The following description will discuss a flow of an information processing method S3 in accordance with the present example embodiment, with reference to FIG. 2. Note that an execution subject of steps in the information processing method S3 may be a processor included in the information processing apparatus 3 or may be a processor included in another apparatus.

In S31, at least one processor acquires training data. The training data includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence.

In S32, the at least one processor generates a learned model by supervised learning using the training data. The learned model is a model that outputs fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

As described above, the information processing method S3 in accordance with the present example embodiment includes: acquiring, by at least one processor, training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and generating, by the at least one processor, a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target. By using a learned model generated by the information processing method S3 in accordance with the present example embodiment, it is possible to bring about an example advantage of, as evaluation of a control plan with respect to a control target, evaluating a plan sequence while taking into consideration long-term influence.

Second Example Embodiment (Overview of Information Processing Apparatus)

An information processing apparatus 1A in accordance with the present example embodiment is an apparatus for evaluating a plan sequence which is a time series of control plans with respect to a control target. Examples of the control target include, but not limited to, a robot arm. The control plan indicates what kind of control is carried out with respect to a control target. The control plan includes, for example, at least one selected from the group consisting of an action class which has been selected from an action class group including a plurality of action classes, and an input value to a robot joint. Here, the action class is a class that indicates, for example, an action of the robot arm such as "grasping" and "moving". Examples of the input value to the robot joint include at least one selected from the group consisting of an input speed, an acceleration, a torque value, and the like. Note, however, that the control plan is not limited to the above examples. The control plan may include information indicating a state of an environment of the control target. Here, the state of the environment includes, for example, a position, a posture, and the like of a moved object which has been predicted by a simulator, in a case where the control target is a robot arm which moves the object. Note, however, that the state of the environment is not limited to the above examples.

Figure 3:
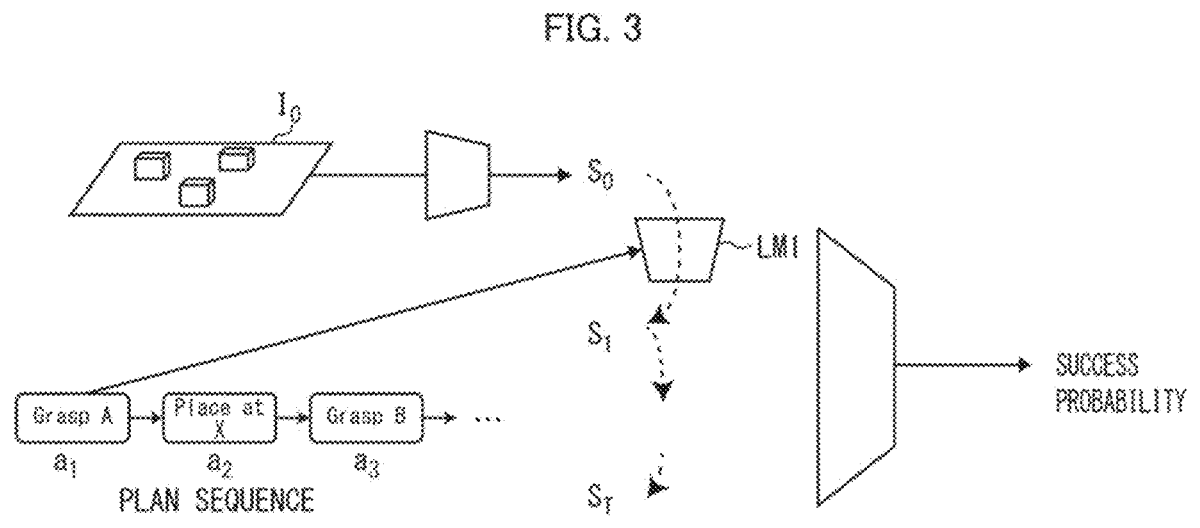

FIG. 3 is a diagram for schematically illustrating a plan sequence evaluation process which is carried out by the information processing apparatus 1A. In FIG. 3, the information processing apparatus 1A first generates state information $s_0$ which represent an initial state by extracting a feature from initial state data $I_0$ including, for example, an initial image which has been obtained by imaging an environment of the initial state. The information processing apparatus 1A then predicts state information $s_1$ indicating a future state by inputting the generated state information $s_0$ and a control plan $a_1$ with respect to a control target into a first learned model LM1 which is a future predictor. Moreover, the information processing apparatus 1A generates a state sequence $(s_1, s_2, \ldots, s_T)$ which is a time series of state information $s_t$ by predicting a future state with use of the first learned model LM1. The information processing apparatus 1A then predicts, with use of the generated state sequence $(s_1, s_2, \ldots, s_T)$, a success probability of a plan sequence $(a_1, a_2, a_3,$ and so forth) which is a time series of control plans.

Here, the state information $s_t$ $(t=0, 1, 2, \ldots, T;$ T is an integer of 1 or more) is information indicating a state of at least one selected from the group consisting of a control target and an environment, and includes, for example, information that indicates at least one selected from the group consisting of a feature quantity obtained from an image, a joint angle of a robot arm, and a position and a posture of an object in an image. The feature quantity obtained from an image is, for example, a feature quantity obtained by inputting an initial image which has been obtained by imaging a control target and/or an environment into a learned model such as a neural network. The object in an image is, for example, an object which is a target of an action (grasping, moving, or the like) of a robot arm. Note, however, that the state information is not limited to the above examples, and the state information may include other information.

The success probability is a probability that a plan sequence $(a_1, a_2, a_3,$ and so forth) will succeed. The success probability calculated by the information processing apparatus 1A is used to create a plan sequence for operating a control target such as a robot arm, for example. For example, the information processing apparatus 1A decides a control plan to give an instruction to the robot arm, by carrying out an optimization process on the plan sequence ($a_1$, $a_2$, $a_3$, and so forth) using the calculated success probability. Note, however, that an application of a success probability calculated by the information processing apparatus 1A is not limited to the above-described example.

The information processing apparatus 1A in accordance with the present example embodiment does not calculate a success probability of a plan from only an initial state but predicts a future state from an initial state and evaluates a plan sequence using the predicted future state sequence. Thus, according to the present example embodiment, it is possible to carry out evaluation while taking into consideration long-term influence.

(Configuration of Information Processing Apparatus)

Figure 4:
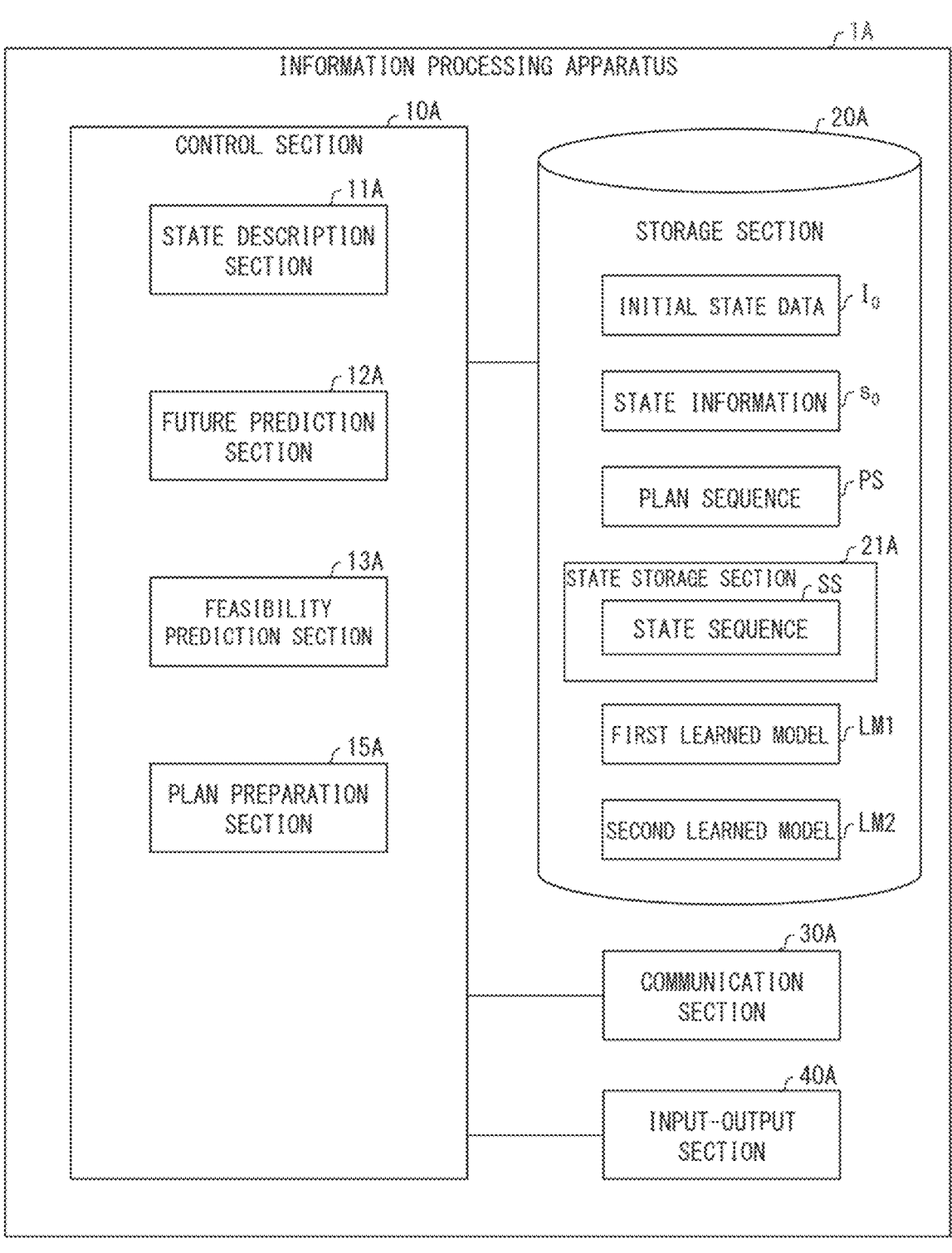
FIG. 4 is a block diagram illustrating a configuration of the information processing apparatus in accordance with the second example embodiment.

FIG. 4 is a block diagram illustrating a configuration of the information processing apparatus 1A. As illustrated in FIG. 4, the information processing apparatus 1A includes a control section 10A, a storage section 20A, a communication section 30A, and an input-output section 40A.

(Communication Section)

The communication section 30A communicates with an apparatus outside the information processing apparatus 1A via a communication line. A specific configuration of the communication line does not limit the present example embodiment, and the communication line is, for example, a wireless local area network (LAN), a wired LAN, a wide area network (WAN), a public network, a mobile data communication network, or a combination of these. The communication section 30A transmits data supplied from the control section 10A to another apparatus or supplies data received from another apparatus to the control section 10A.

(Input-Output Section)

Input-output apparatuses such as a keyboard, a mouse, a display, a printer, and a touch panel are connected to the input-output section 40A. The input-output section 40A receives input of various kinds of information with respect to the information processing apparatus 1A from a connected input apparatus. The input-output section 40A outputs various kinds of information to a connected output apparatus under control of the control section 10A. Examples of the input-output section 40A include an interface such as a universal serial bus (USB).

(Control Section)

As illustrated in FIG. 4, the control section 10A includes a state description section 11A, a future prediction section 12A, a feasibility prediction section 13A, and a plan preparation section 15A.

The state description section 11A generates state information from initial state data $I_0$ which indicates an initial state of a control target and an environment, and causes the storage section 20A to store the generated state information as state information $s_0$. The initial state data $I_0$ is data that indicates an initial state of a control target and an environment. For example, the initial state data $I_0$ includes data that indicates an image obtained by imaging a control target and an environment, a posture of a robot, and the like. The initial state data $I_0$ can include, for example, data indicating a position and a posture of an article that is a target of a task (grasping, moving, or the like) of a robot arm. The initial state data $I_0$ is not limited to the above examples. The initial state data $I_0$ may include other data.

The state information $s_0$ is information generated from the initial state data $I_0$. The state information $s_0$ is, for example, a combination of (i) a set of feature quantities obtained by inputting images of an environment and a control target in an initial state into a learned model such as a neural network, (ii) a set of joint angles of the robot arm, and (iii) a set of positions and postures of objects in images. As the state information $s_0$, for example, a vector representing a state can be used. The state information is not limited to a vector, and may be other information.

The plan preparation section 15A generates a plan sequence which is a time series of control plans with respect to a control target, and causes the storage section 20A to store the generated plan sequence as a plan sequence PS. The plan sequence PS is, for example, a sequence of T control plans $a_t$ ($t=1$, 2, . . . , T) from time $t=1$ to T.

The future prediction section 12A generates a state sequence with use of output obtained by inputting the state information $s_0$ and control plans included in the plan sequence PS into the first learned model LM1, the state sequence being a time series of pieces of state information each indicating a predicted future state. The future prediction section 12A is an example of the acquisition means and the generation means in this specification. The future prediction section 12A causes a state storage section 21A of the storage section 20A to store the generated state sequence as a state sequence SS.

The feasibility prediction section 13A calculates, with use of the state sequence SS, a success probability of the plan sequence PS. The feasibility prediction section 13A is an example of the calculation means in this specification. For example, the feasibility prediction section 13A calculates, with use of a state sequence generated by the future prediction section 12A and a second learned model LM2 generated by machine learning, a success probability of the plan sequence PS generated by the plan preparation section 15A. Note that the feasibility prediction section 13A may be configured to calculate a success probability without using the second learned model LM2. For example, the feasibility prediction section 13A may calculate a success probability based on a comparison result between the state sequence SS generated by the future prediction section 12A and a state information group of success states which has been prepared in advance. Here, the state information of the success state is a sequence of pieces of state information each indicating a state (i.e., a transitioned state) which has transitioned when a control plan was actually carried out in the past. Details of a process which is carried out by the feasibility prediction section 13A will be described later.

The feasibility prediction section 13A may output the calculated success probability to an output apparatus connected via the input-output section 40A or may transmit the calculated success probability via the communication section 30A. The feasibility prediction section 13A may output the information by writing the success probability into a storage location (that may be in a storage apparatus of the information processing apparatus 1A or may be a storage apparatus outside the information processing apparatus 1A) designated by a user of the information processing apparatus 1A. The feasibility prediction section 13A may supply the success probability to a control information generation section (not illustrated) that generates control information for controlling a control target.

(Storage Section)

The storage section 20A stores initial state data $I_0$ and state information $s_0$. The storage section 20A stores a plan sequence PS generated by the plan preparation section 15A and a state sequence SS generated by the future prediction section 12A. The storage section 20A stores the first learned model LM1 and the second learned model LM2. Storing the first learned model LM1 and the second learned model LM2 in the storage section 20A means that parameters defining the first learned model LM1 and parameters defining the second learned model LM2 are stored in the storage section 20A.

(First Learned Model)

The first learned model LM1 is a model that is used by the future prediction section 12A to predict a future state. The first learned model LM1 may use a deterministic method or may use a probabilistic method. The first learned model LM1 includes, for example, at least one selected from the group consisting of a recurrent neural network and a graph neural network. Examples of the recurrent neural network include, but not limited to, a recurrent neural network (RNN), a long short-term memory (LSTM), and a gated recurrent unit (GRU). The first learned model LM1 may include, for example, a variational autoencoder (VAE).

Input into the first learned model LM1 includes, for example, a control plan at time t and state information $s_{t-1}$ at time (t−1). In other words, the input into the first learned model LM1 includes a control plan at with respect to a control target and state information $s_{t-1}$ that indicates a state of at least one selected from the group consisting of the control target and an environment before the control plan at is carried out. The state information $s_{t-1}$ is an example of third state information in this specification. Output of the first learned model LM1 includes, for example, state information $s_t$ at time t. In other words, the output of the first learned model LM1 includes state information $s_t$ indicating a transitioned state of state information $s_{t-1}$. The state information $s_t$, which is output from the first learned model LM1, is used in a process of calculating a success probability of a plan sequence $(a_1, a_2, \ldots, a_T)$, as described above.

(Second Learned Model)

The second learned model LM2 is a model that is used by the feasibility prediction section 13A to calculate a success probability of the plan sequence PS. The second learned model LM2 is a learned model constructed by machine learning using training data. A method of machine learning of the second learned model LM2 is not limited. For example, a decision tree-based method, a linear regression method, or a neural network method may be used, or two or more of these methods may be used. The input into and output of the second learned model LM2 will be described later.

(Flow of Process Carried Out by Information Processing Apparatus)

Figure 5:
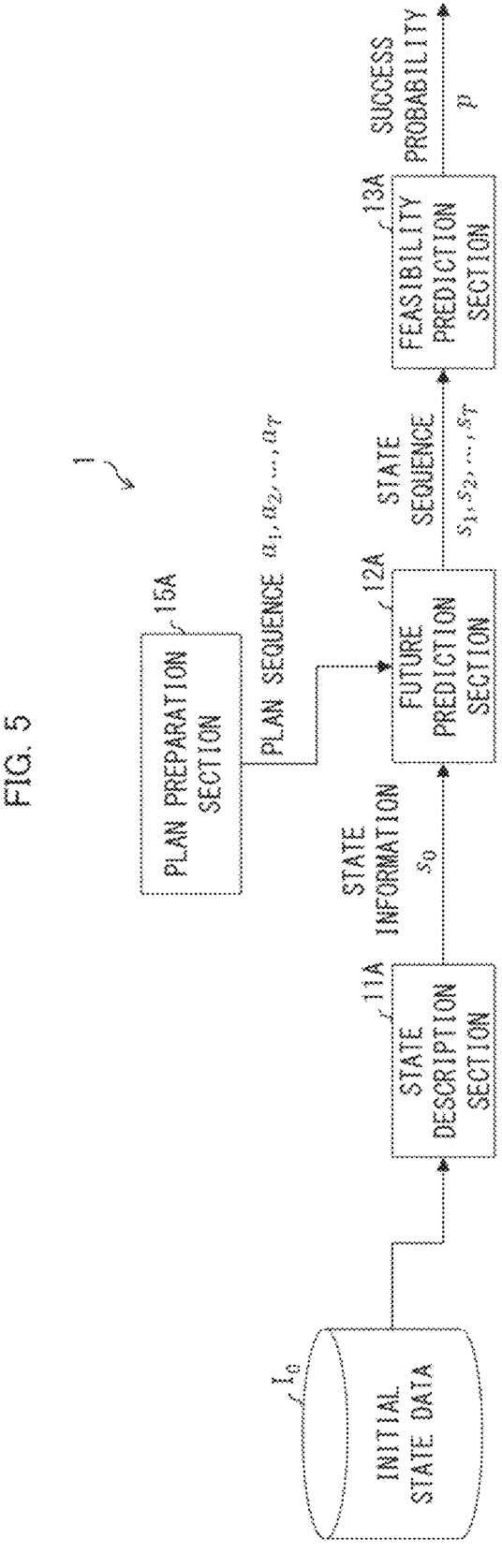
FIG. 5 is a diagram illustrating an example flow of a process which is carried out by the information processing apparatus in accordance with the second example embodiment.
Figure 6:
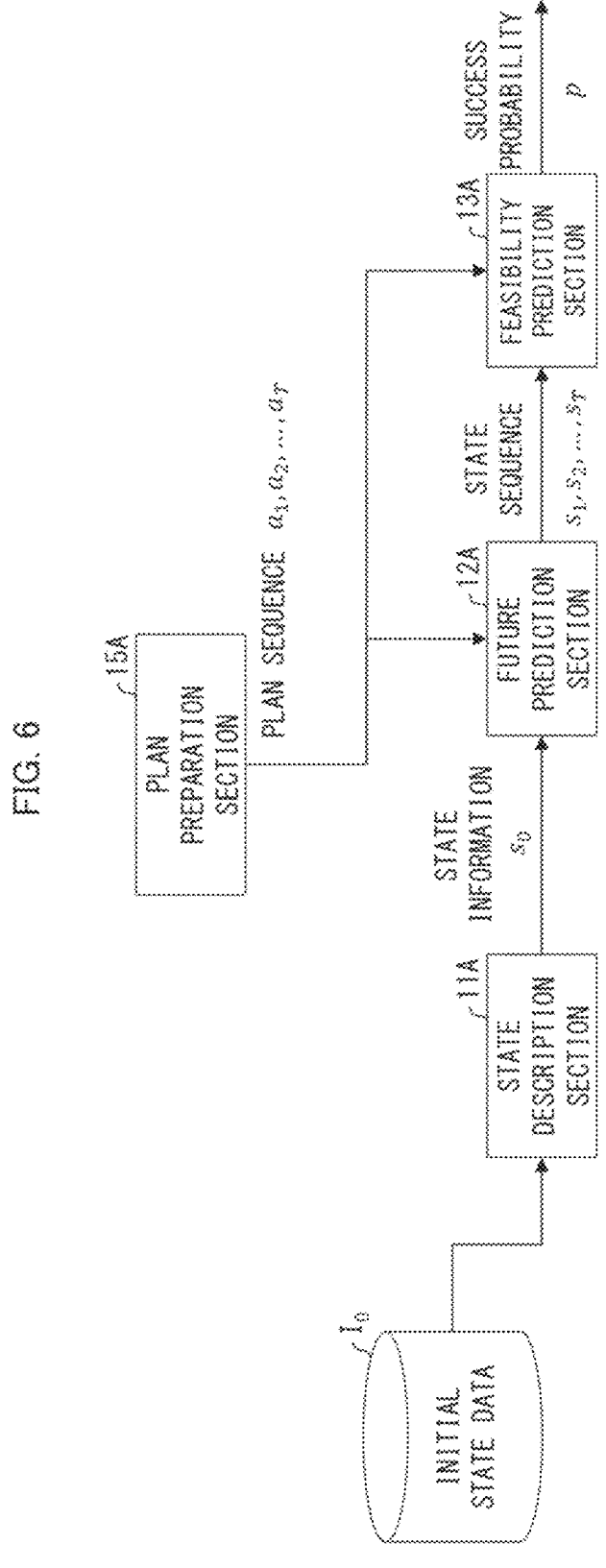
FIG. 6 is a diagram illustrating an example flow of a process which is carried out by the information processing apparatus in accordance with the second example embodiment.
Figure 7:
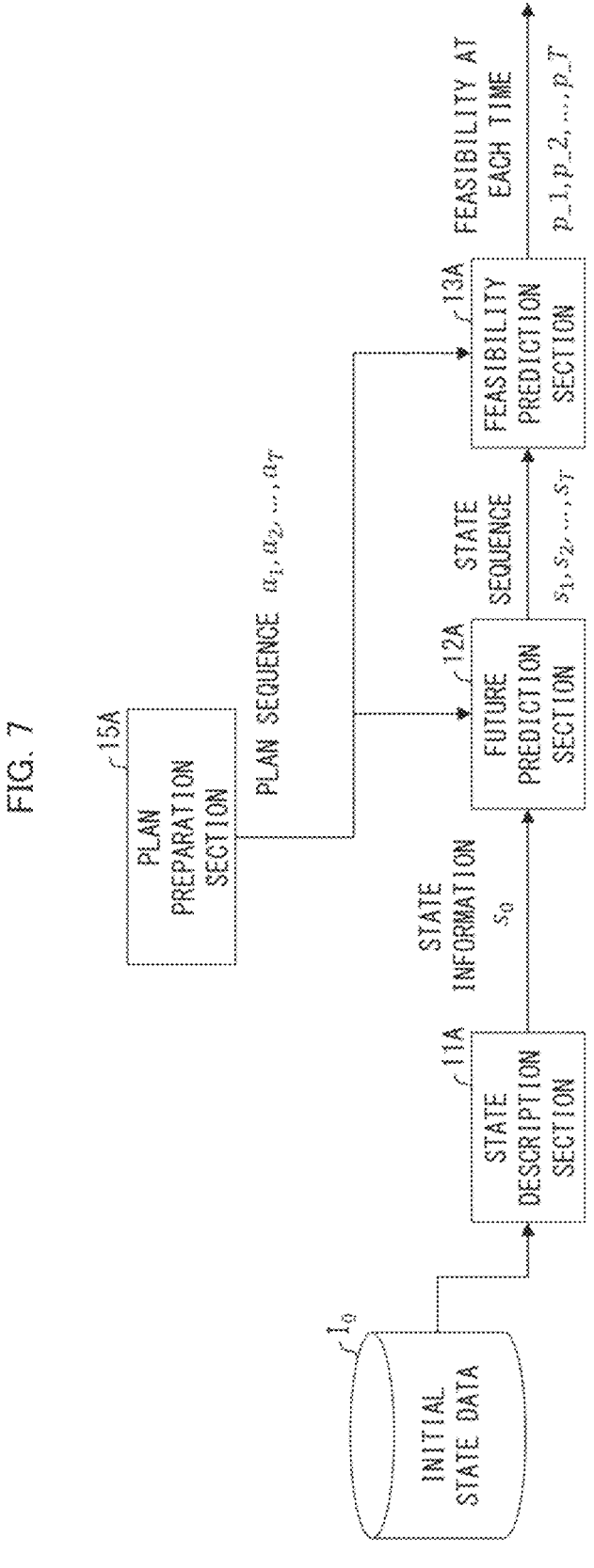
FIG. 7 is a diagram illustrating an example flow of a process which is carried out by the information processing apparatus in accordance with the second example embodiment.

FIGS. 5 through 7 are diagrams each illustrating an example flow of a process which is carried out by the information processing apparatus 1A. Note that the unidirectional arrow in the drawings briefly indicates a flow direction of a certain signal (data), and does not exclude bidirectionality.

In FIG. 5, the state description section 11A extracts a feature from the initial state data $I_0$ and generates state information $s_0$. Moreover, the plan preparation section 15A generates a plan sequence $(a_1, a_2, \ldots, a_T)$. The future prediction section 12A generates a state sequence $(s_1, s_2, \ldots, s_T)$ using the state information $s_0$ generated by the state description section 11A and the plan sequence $(a_1, a_2, \ldots, a_T)$ generated by the plan preparation section 15A. The feasibility prediction section 13A calculates a success probability p with use of the state sequence $(s_1, s_2, \ldots, s_T)$.

In the example illustrated in FIG. 6, in addition to the future state sequence $(s_1, s_2, \ldots, s_T)$, the plan sequence $(a_1, a_2, \ldots, a_T)$ generated by the plan preparation section 15A is input to the feasibility prediction section 13A. In this case, the feasibility prediction section 13A calculates a success probability p using the future state sequence $(s_1, s_2, \ldots, s_T)$ and the plan sequence $(a_1, a_2, \ldots, a_T)$. The calculation process for calculating the success probability p, which is carried out by the feasibility prediction section 13A, will be described later.

In the example illustrated in FIG. 7, the feasibility prediction section 13A calculates and outputs a success probability $p_t$ at each time t, rather than a success probability p of the entire plan sequence $(a_1, a_2, \ldots, a_T)$ which is a time series. At this time, in addition to the success probability $p_t$ at each time t, the feasibility prediction section 13A may output state information $s_t$ which is predicted at each time t.

Example Configuration of Future Prediction Section

Figure 8:
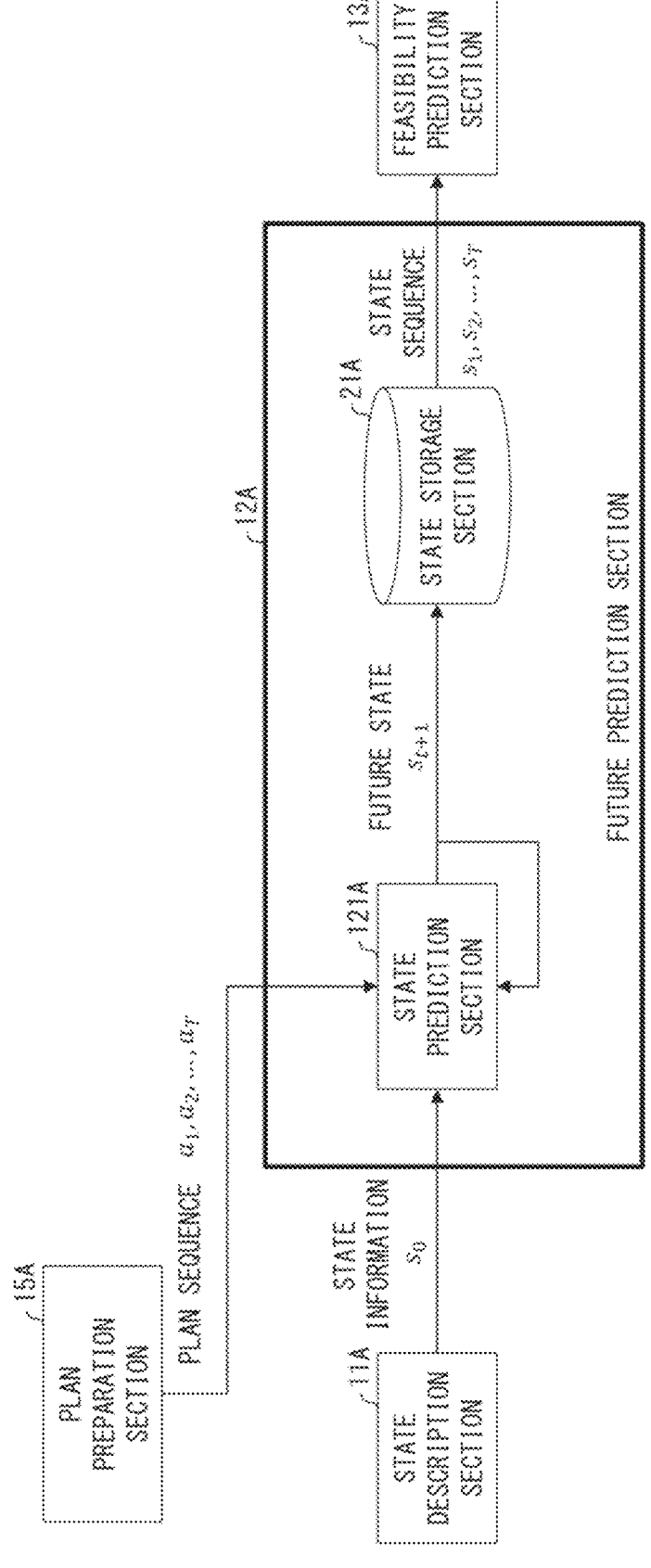
FIG. 8 is a diagram illustrating an example configuration of a future prediction section in accordance with the second example embodiment.

FIG. 8 is a diagram illustrating an example configuration of the future prediction section 12A. In the example illustrated in FIG. 8, the future prediction section 12A includes a state prediction section 121A and the state storage section 21A. The state prediction section 121A predicts a future state step by step using state information so indicating an initial state, a plan sequence $(a_1, a_2, \ldots, a_T)$ obtained from the plan preparation section 15A, and the first learned model LM1. The state storage section 21A stores a future state sequence $(s_1, s_2, \ldots, s_T)$ predicted by the state prediction section 121A, and supplies the future state sequence to the feasibility prediction section 13A.

Example Configuration of Feasibility Prediction Section

Figure 9:
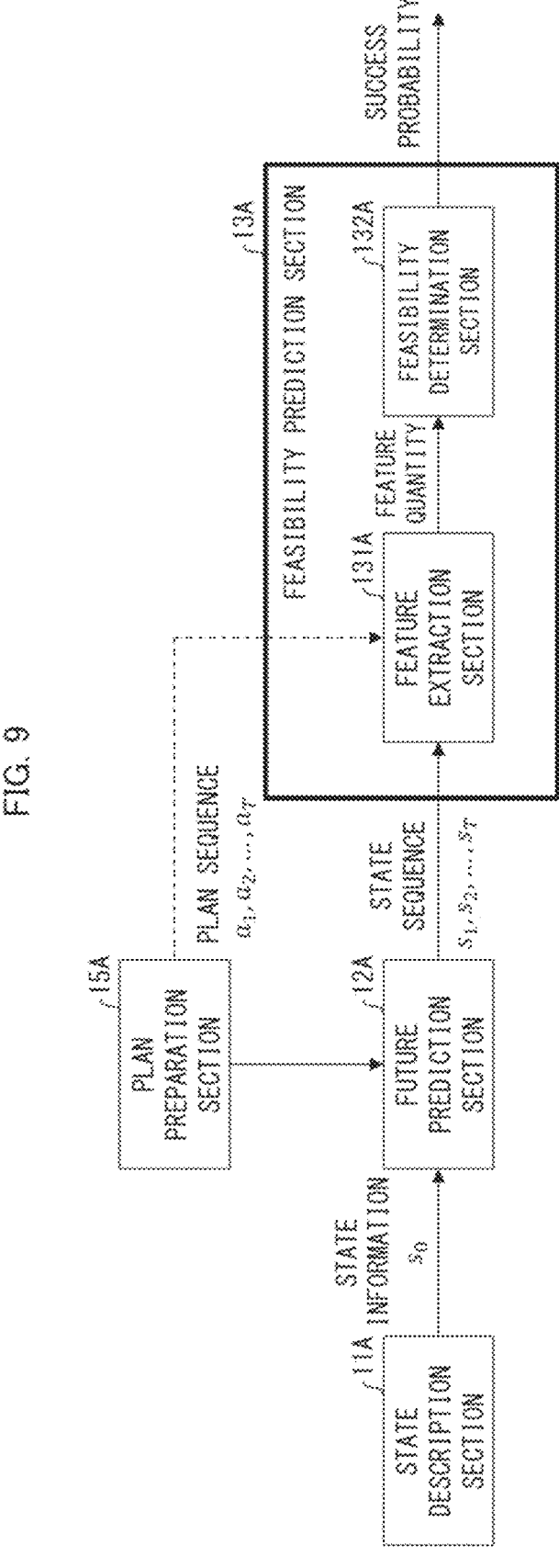
FIG. 9 is a diagram illustrating an example configuration of a feasibility prediction section in accordance with the second example embodiment.

FIG. 9 is a diagram illustrating an example configuration of the feasibility prediction section 13A. In the example illustrated in FIG. 9, the feasibility prediction section 13A includes a feature extraction section 131A and a feasibility determination section 132A. The feature extraction section 131A calculates a feature quantity based on the future state sequence $(s_1, s_2, \ldots, s_T)$ obtained from the future prediction section 12A. Examples of the feature quantity calculated by the feature extraction section 131A include, but not limited to, an average of a plurality of pieces of state information $s_t$ included in a state sequence $(s_1, s_2, \ldots, s_T)$, a success probability $p_t$ of each piece of state information $s_t$, and the like. In FIG. 9, a plan sequence $(a_1, a_2, \ldots, a_T)$ may be input into the feature extraction section 131A. In this case, the feature extraction section 131A calculates a feature quantity based on the future state sequence $(s_1, s_2, \ldots, s_T)$ and the plan sequence $(a_1, a_2, \ldots, a_T)$. The feasibility determination section 132A calculates a success probability p based on the feature quantity extracted by the feature extraction section 131A.

Specific Examples 1 Through 4 of Feasibility Prediction Section

The following description will discuss specific examples 1 through 4 of the feasibility prediction section 13A with reference to FIGS. 10 through 13. FIGS. 10 through 13 are diagrams each illustrating a specific example of a process which is carried out by the feasibility prediction section 13A. FIGS. 10 through 13 each illustrate an example in which state information $s_t$ is a vector representing a state. Hereinafter, for convenience of explanation, a vector representing a state is also referred to as a "state vector".

Specific Example 1 of Feasibility Prediction Section

Figure 10:
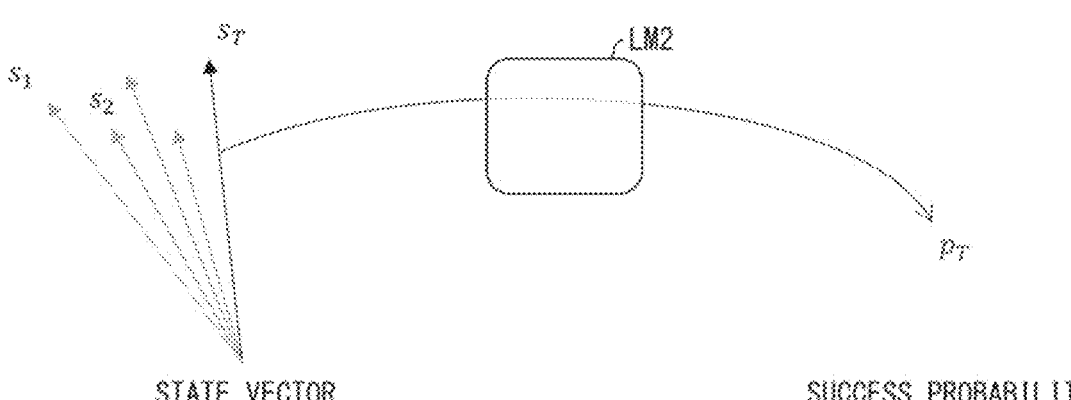
FIG. 10 is a diagram illustrating a specific example of a process which is carried out by the feasibility prediction section in accordance with the second example embodiment.

In the example illustrated in FIG. 10, the feature extraction section 131A calculates a success probability PT by inputting, into the second learned model LM2, a last piece of state information $s_T$ included in a future state sequence $(s_1, s_2, \ldots, s_T)$. In this case, the second learned model LM2 is, for example, a learned model constructed by machine learning using training data that includes a plurality of sets of state information and a label indicating whether or not the state information has reached a target state (e.g., whether or not a task performed by a control target has succeeded). In this case, input into the second learned model LM2 includes the last piece of state information $s_T$ included in the state sequence $(s_1, s_2, \ldots, s_T)$. Here, input into the second learned model LM2 may include a plan sequence $(a_1, a_2, \ldots, a_T)$. Output of the second learned model LM2 includes a success probability PT. The second learned model LM2 can be, for example, a neural network in which fully-connected layers are stacked in multiple stages.

In the example illustrated in FIG. 10, the feasibility determination section 132A outputs, directly as a success probability p, the success probability PT which has been received from the feature extraction section 131A.

Specific Example 2 of Feasibility Prediction Section

Figure 11:
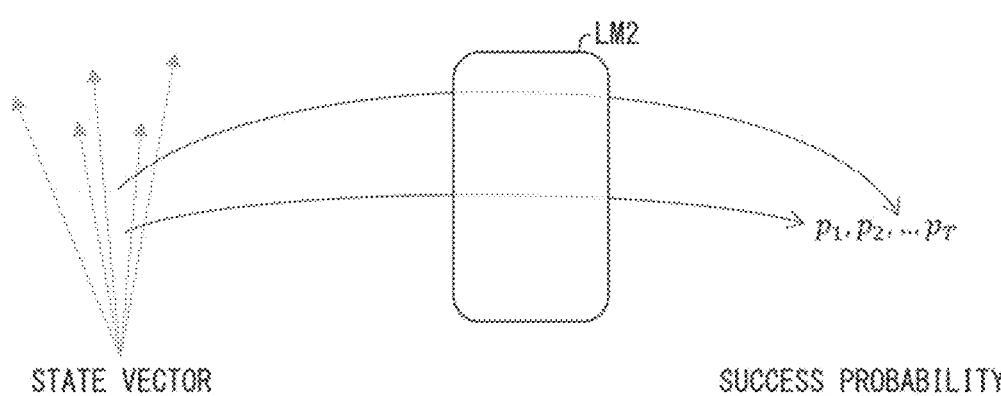
FIG. 11 is a diagram illustrating a specific example of a process which is carried out by the feasibility prediction section in accordance with the second example embodiment.

Next, in the example illustrated in FIG. 11, the feature extraction section 131A calculates a success probability $p_t$ of each piece of state information $s_t$ by inputting, into the second learned model LM2, each piece of the state information $s_t$ included in the state sequence $(s_1, s_2, \ldots, s_T)$. The feature extraction section 131A then calculates a success probability p of a plan sequence $(a_1, a_2, \ldots, a_T)$ based on a statistical result of success probabilities $p_t$ for the respective calculated pieces of state information $s_t$.

In this example, the second learned model LM2 is, for example, a learned model constructed by machine learning using training data that includes state information and a label indicating whether or not the state information has reached a target state. In this case, input into the second learned model LM2 includes a state sequence $(s_1, s_2, \ldots, s_T)$, and output of the second learned model LM2 includes success probabilities $p_1, p_2, \ldots p_T$. Input into the second learned model LM2 may include a plan sequence $(a_1, a_2, \ldots, a_T)$.

The feasibility determination section 132A calculates, for example, a product of the success probabilities $p_1, p_2, \ldots, p_T$ which have been received from the feature extraction section 131A, and determines the product as a final success probability p. Note, however, that a method in which the feasibility determination section 132A calculates a success probability p from success probabilities $p_1, p_2, \ldots, p_T$ is not limited to the above example. The feasibility determination section 132A may calculate a success probability p based on, for example, a sum of the success probabilities $p_1, p_2, \ldots, p_T$. Alternatively, the feasibility determination section 132A may calculate a success probability p based on, for example, a sum total of values obtained by multiplying each of the success probabilities $p_1, p_2, \ldots, p_T$ by a weight value $\alpha_t$.

Specific Example 3 of Feasibility Prediction Section

Figure 12:
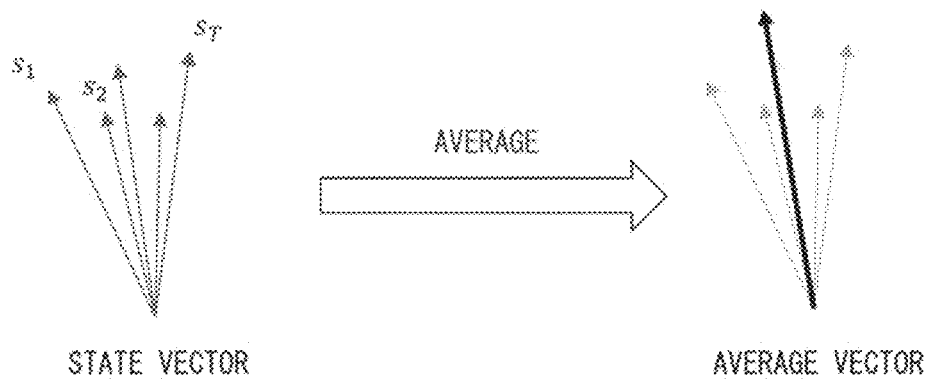
FIG. 12 is a diagram illustrating a specific example of a process which is carried out by the feasibility prediction section in accordance with the second example embodiment.

In the example illustrated in FIG. 12, the feature extraction section 131A calculates an average vector of T state vectors included in a state sequence $(s_1, s_2, \ldots, s_T)$, and the feasibility determination section 132A calculates a success probability p by inputting, into the second learned model LM2, the average vector which has been calculated by the feature extraction section 131A. In this example, the second learned model LM2 is a learned model constructed by machine learning using training data that includes, for example, an average vector and a label, the average vector being an average of state vectors included in a state sequence, and the label indicating whether or not a state has reached a target state. In this case, input into the second learned model LM2 includes an average vector, and output of the second learned model LM2 includes a success probability p. Input into the second learned model LM2 may include a plan sequence $(a_1, a_2, \ldots, a_T)$. The second learned model LM2 can be a neural network such as, for example, a multilayer perceptron (MLP).

Specific Example 4 of Feasibility Prediction Section

Figure 13:
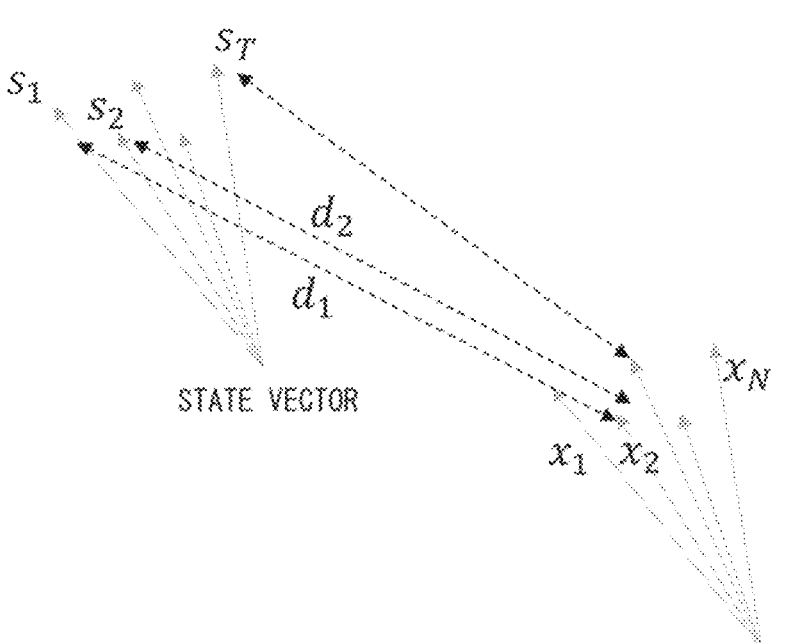
FIG. 13 is a diagram illustrating a specific example of a process which is carried out by the feasibility prediction section in accordance with the second example embodiment.

In the example illustrated in FIG. 13, the feasibility prediction section 13A calculates a success probability p based on a difference between a state sequence $(s_1, s_2, \ldots, s_T)$ generated by the future prediction section 12A and a state information group included in success data prepared in advance. Here, the success data is data indicating an actual transitioned state obtained when a control plan has been carried out.

For example, the feature extraction section 131A calculates, as a feature quantity $d_t$ of a state vector $s_t$, a smallest distance between the state vector $s_t$ and a state vector group $\{x_1, x_2, \ldots x_N\}$ of success data which has been stored in advance. That is, the feature extraction section 131A calculates the feature quantity $d_t$ according to the following formula. In the formula, $i=1, 2, \ldots, N$, and N is a total number of state vectors of success data.

$$d_t = \min_i \|s_t - x_i\|_2$$

The feasibility determination section 132A calculates a success probability p with use of feature quantities $d_1, d_2, \ldots, d_T$ which have been calculated by the feature extraction section 131A. The feasibility determination section 132A calculates, for example, a largest value of the feature quantities $d_1, d_2, \ldots, d_T$ as a success probability p using the following formula.

$$p = \frac{1}{\max(d_1, d_2, \ldots d_T)}$$

Example Advantage of Information Processing Apparatus

As described above, according to the information processing apparatus 1A in accordance with the present example embodiment, the feasibility prediction section 13A calculates, with use of a state sequence $(s_1, s_2, \ldots, s_T)$ and the second learned model LM2, a success probability p of a plan sequence $(a_1, a_2, \ldots, a_T)$. The probability p is thus calculated using not only state information $s_0$ at a single time but also a result of predicting a future state. Therefore, as evaluation of a control plan with respect to a control target, it is possible to evaluate a plan sequence $(a_1, a_2, \ldots, a_T)$ while taking into consideration long-term influence.

The feasibility prediction section 13A in accordance with the present example embodiment calculates a success probability p by inputting, into the second learned model LM2, a last piece of state information $s_T$ included in a state sequence $(s_1, s_2, \ldots, s_T)$. Therefore, according to the information processing apparatus 1A in accordance with the present example embodiment, it is possible to carry out evaluation while taking into consideration long-term influence which cannot be obtained by evaluation using only initial state information $s_0$.

The feasibility prediction section 13A in accordance with the present example embodiment calculates a success probability $p_t$ of each piece of state information $s_t$ by inputting, into the second learned model LM2, each piece of the state information $s_t$ included in the state sequence $(s_1, s_2, \ldots, s_T)$, and then calculates a success probability $p$ of a plan sequence $(a_1, a_2, \ldots, a_T)$ based on a statistical result of calculated success probabilities $p_t$. Therefore, according to the information processing apparatus 1A in accordance with the present example embodiment, it is possible to carry out evaluation while taking into consideration influence of an intermediate state included in pieces of state information $s_1$ through $s_T$.

The feasibility prediction section 13A in accordance with the present example embodiment calculates an average vector of state vectors $s_t$ included in a state sequence $(s_1, s_2, \ldots, s_T)$, and calculates a success probability $p$ by inputting, into the second learned model LM2, the calculated average vector. Therefore, according to the information processing apparatus 1A in accordance with the present example embodiment, it is possible to carry out evaluation while taking into consideration influence of states indicated by state vectors $s_1$ through $s_T$.

In the information processing apparatus 1A in accordance with the present example embodiment, the state information $s_t$ includes information that indicates at least one selected from the group consisting of a feature quantity obtained from an image, a joint angle of a robot arm, and a position and a posture of an object in an image. Therefore, according to the information processing apparatus 1A in accordance with the present example embodiment, it is possible to carry out evaluation while taking into consideration long-term influence of a feature quantity obtained from an image, a joint angle of a robot arm, a position and a posture of an object in an image, and the like.

In the information processing apparatus 1A in accordance with the present example embodiment, the control plan at includes at least one selected from the group consisting of an action class which has been selected from an action class group including a plurality of action classes, and an input value to a robot joint. Therefore, according to the information processing apparatus 1A in accordance with the present example embodiment, it is possible to evaluate an action class, an input value to a robot joint, and the like while taking into consideration long-term influence.

In the information processing apparatus 1A in accordance with the present example embodiment, the control plan at includes information indicating a state of an environment. Therefore, according to the information processing apparatus 1A in accordance with the present example embodiment, by calculating a success probability $p$ with use of the control plan at including a state of an environment, it is possible to evaluate a plan sequence with higher accuracy.

Third Example Embodiment

The following description will discuss a third example embodiment of the present invention in detail, with reference to the drawings. The same reference numerals are given to constituent elements which have functions identical with those described in the second example embodiment, and descriptions as to such constituent elements are not repeated.

Figure 14:
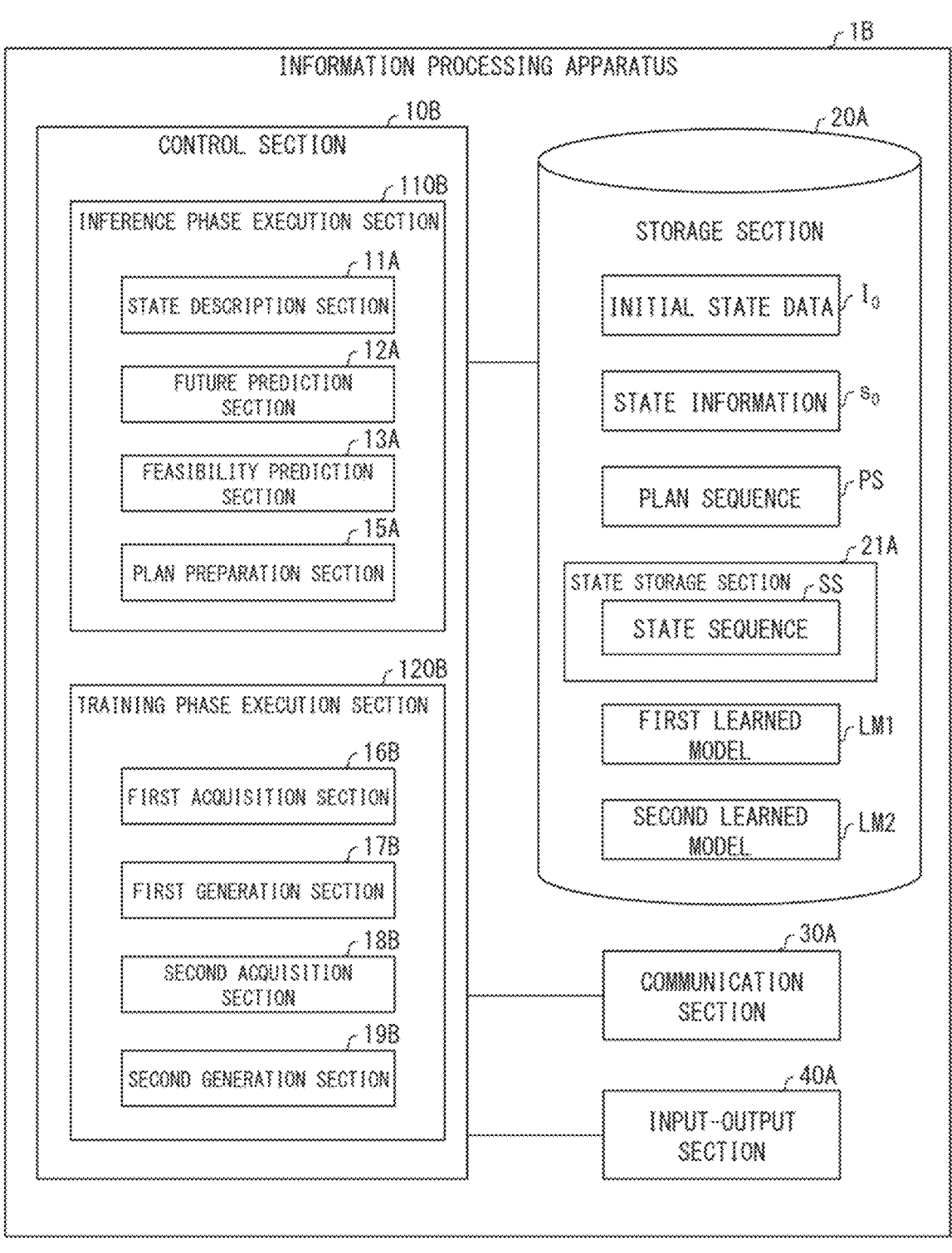
FIG. 14 is a block diagram illustrating a configuration of the information processing apparatus in accordance with a third example embodiment.

FIG. 14 is a block diagram illustrating a configuration of an information processing apparatus 1B in accordance with the third example embodiment. The information processing apparatus 1B includes a control section 10B, a storage section 20A, a communication section 30A, and an input-output section 40A. The control section 10B includes an inference phase execution section 110B and a training phase execution section 120B. The inference phase execution section 1101B includes a state description section 11A, a future prediction section 12A, a feasibility prediction section 13A, and a plan preparation section 15A.

The training phase execution section 120B includes a first acquisition section 16B, a first generation section 17B, a second acquisition section 18B, and a second generation section 19B. The first acquisition section 16B and the second acquisition section 18B are examples of the acquisition means in this specification. The first generation section 17B and the second generation section 19B are examples of the generation means in this specification. The training phase execution section 120B generates a first learned model LM1 and a second learned model LM2 by machine learning using data set.

Figure 15:
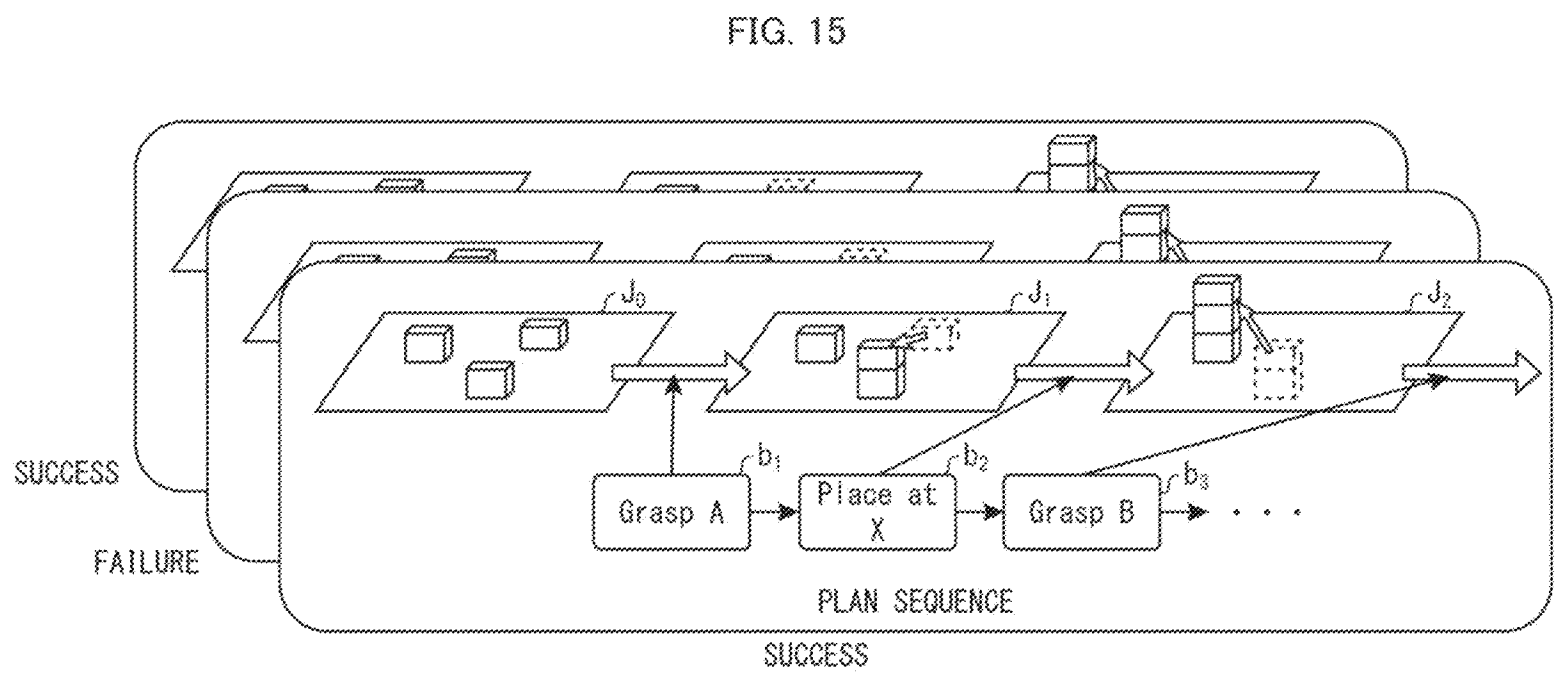
Figure 16:
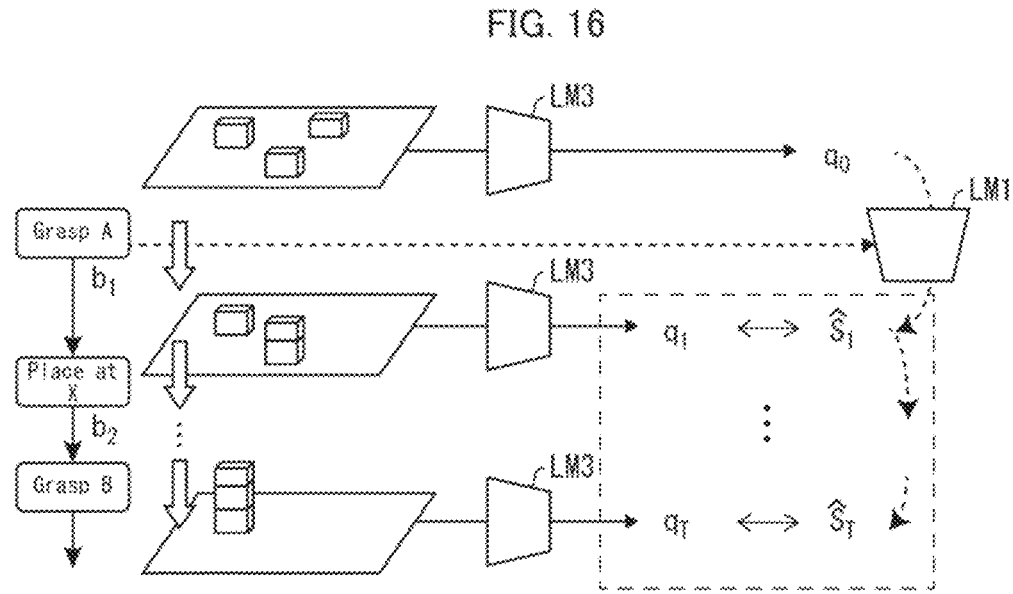
FIG. 16 is a diagram illustrating an example of a method for training a first learned model in accordance with the third example embodiment.

FIG. 15 is a diagram illustrating a specific example of a data set used in training of the first learned model LM1, the second learned model LM2, and/or a third learned model LM3 (see FIG. 16). Here, the third learned model LM3 is a third learned model used by the state description section 11A to generate state information, and is, for example, a neural network. In the example illustrated in FIG. 15, the data set includes a plurality of sets of (i) a pair of a plan sequence $(b_1, b_2, b_3,$ and so forth) and a sequence of pieces of state data $(J_0, J_1, J_2,$ and so forth) and (ii) a binary label, the plan sequence $(b_1, b_2, b_3,$ and so forth) being a time series of control plans $b_t$ with respect to a control target, the sequence of pieces of state data $(J_0, J_1, J_2,$ and so forth) being a sequence of pieces of state data each indicating a state of at least one selected from the group consisting of the control target and an environment, the pieces of state data being obtained by carrying out the respective control plans $b_t$ included in the plan sequence $(b_1, b_2, b_3,$ and so forth), and the binary label indicating whether or not a task performed by the control target has succeeded by carrying out the control plans $b_t$ included in the plan sequence $(b_1, b_2, b_3,$ and so forth).

The first acquisition section 16B acquires a data set and generates training data from the acquired data set. The first acquisition section 16B may acquire a data set which is input via the input-output section 40A, or may acquire a data set from a storage location (that may be in the storage section 20A of the information processing apparatus 1B or may be a storage apparatus outside the information processing apparatus 1B) designated by a user of the information processing apparatus 1B. The training data includes a plan sequence $(b_1, b_2, b_3,$ and so forth) and pieces of state information $q_1, q_2, q_3,$ and so forth which have been generated from respective pieces of state data $J_0, J_1, J_2,$ and so forth. The first generation section 17B generates a first learned model LM1 by machine learning using the training data.

FIG. 16 is a diagram illustrating an example of a method for training the first learned model LM1. In the example illustrated in FIG. 16, the first generation section 17B trains the first learned model LM1 (or the first learned model LM1 and the third learned model LM3) so that a difference is reduced between (a) pieces of state information $q_1, \ldots, q_T$ indicating a transitioned state obtained when control plans $b_1$, $b_2$, $b_3$, and so forth are actually carried out and (b) pieces of state information $s^\wedge_1, \ldots, s^\wedge_T$ predicted by the first learned model LM1. More specifically, the first generation section 17B updates, for example, parameters that define the first learned model LM1 and the like, with use of a mean square error of state information $q_t$ indicating an actual state and state information $s^\wedge_t$ indicating a predicted state.

In other words, in this example, training data used to train the first learned model LM1 includes (i) state information $q_0$ indicating a state of at least one selected from the group consisting of a control target and an environment, and a plan sequence ($b_1$, $b_2$, $b_3$, and so forth) which is a time series of control plans $b_t$ with respect to the control target and (ii) state information $q_1$, $q_2$, $q_3$, and so forth obtained by carrying out the control plans $b_t$ included in the plan sequence ($b_1$, $b_2$, $b_3$, and so forth). The state information $q_0$ is an example of the first state information in this specification, and the pieces of state information $q_1$, $q_2$, $q_3$, and so forth are examples of the second state information in this specification.

The second acquisition section 18B generates training data for use in training of the second learned model LM2. The training data includes a plan sequence ($b_1$, $b_2$, $b_3$, and so forth) and pieces of state information $q_1$, $q_2$, $q_3$, and so forth which have been generated from respective pieces of state data $J_0$, $J_1$, $J_2$, and so forth. The second generation section 19B generates a second learned model LM2 by supervised learning using the training data, the second learned model LM2 outputting a success probability of a plan sequence which is a time series of control plans with respect to a control target.

Figure 17:
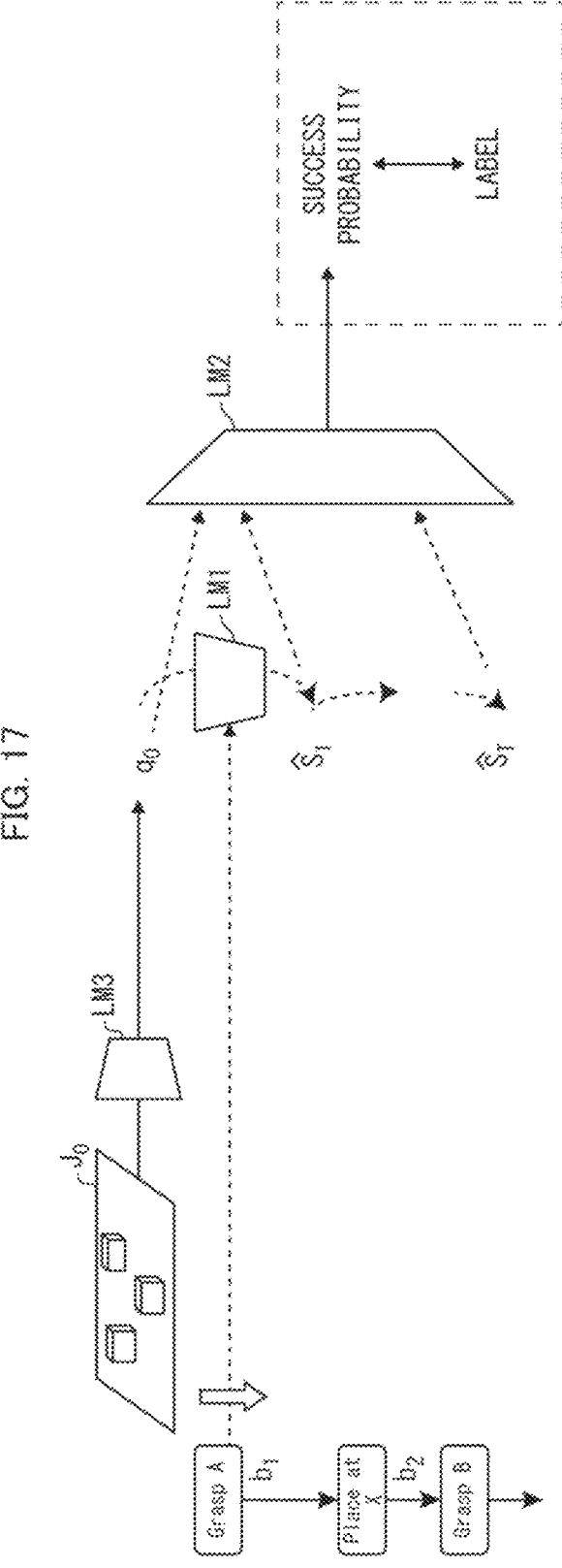
FIG. 17 is a diagram illustrating an example of a method for training the first learned model and a second learned model in accordance with the third example embodiment.

FIG. 17 is a diagram illustrating an example of a method for training the second learned model LM2. In the example illustrated in FIG. 17, the second learned model LM2 is a learned model into which state information $s_t$ included in a state sequence ($s_1$, $s_2$, $\ldots$, $s_T$) is input and which outputs a success probability p. Input into the second learned model LM2 may include a plan sequence ($a_1$, $a_2$, $\ldots$, $a_T$). In this example, the second generation section 19B trains the second learned model LM2 so that a success probability p output by the second learned model LM2 matches a training label included in the training data. In other words, the second generation section 19B trains the second learned model LM2 so that a success probability output by the second learned model LM2 matches a label included in the training data. At this time, the second generation section 19B may train not only the second learned model LM2 but also the third learned model LM3 and/or the first learned model LM1 together, which are used by the state description section 11A to generate state information. For example, the second generation section 19B trains the second learned model LM2 and the like using a cross-entropy error.

Figure 18:
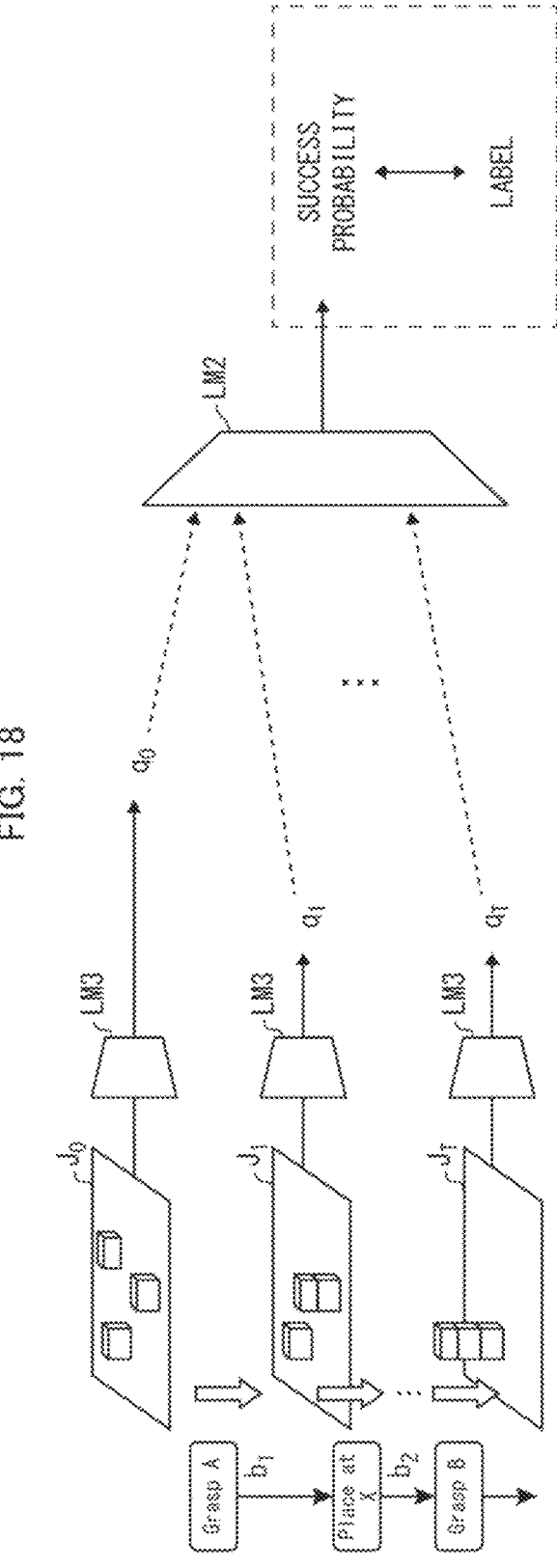
FIG. 18 is a diagram illustrating an example of a method for training the second learned model in accordance with the third example embodiment.

FIG. 18 is a diagram illustrating an example of a method for training the second learned model LM2. In the example illustrated in FIG. 18, the second learned model LM2 is a learned model into which state information $s^\wedge_t$ included in a state sequence ($s^\wedge_1$, $s^\wedge_2$, $\ldots$, $s^\wedge_T$) is input and which outputs a success probability p. Input into the second learned model LM2 may include a plan sequence ($a_1$, $a_2$, $\ldots$, $a_T$). In this example, the second generation section 19B trains the first learned model LM1 and the second learned model LM2 so that a success probability output by the second learned model LM2 matches a label included in the training data, while a difference is reduced between state information $s^\wedge_t$ output by the first learned model LM1 and state information $q_t$ included in the training data. At this time, the second generation section 19B may also train the third learned model LM3 in addition to the first learned model LM1 and the second learned model LM2. For example, the second generation section 19B (a) calculates a mean square error using state information $q_t$ and state information $s^\wedge_t$ in order to reduce a difference between the state information $s^\wedge_t$ and the state information $q_t$ indicating an actual state, (b) calculates a cross-entropy error using a success probability and a label which have been output in order that a success probability output by the second learned model LM2 matches a label included in the training data, and (c) trains the second learned model LM2 and the like.

Example Advantage of Information Processing Apparatus

As described above, the information processing apparatus 1B in accordance with the present example embodiment employs the configuration in which: the second learned model LM2 is a learned model that outputs a success probability p while using, as input, state information included in a state sequence; and the second generation section 19B trains the second learned model LM2 so that a success probability p output by the second learned model LM2 matches a label included in the training data. By calculating a success probability p of a plan sequence ($a_1$, $a_2$, $a_3$, $\ldots$, $a_T$) using the second learned model LM2 generated by the information processing apparatus 1B in accordance with the present example embodiment, it is possible, as evaluation of a control plan with respect to a control target, to evaluate a plan sequence while taking into consideration long-term influence.

The information processing apparatus 1B in accordance with the present example embodiment employs the configuration in which: the second learned model LM2 is a learned model that outputs a success probability p while using, as input, state information included in a state sequence ($s_1$, $s_2$, $\ldots$, $s_T$); and the second generation section 19B trains the first learned model LM1 and the second learned model LM2 so that a success probability output by the second learned model LM2 matches a label included in the training data, while a difference is reduced between state information output by the first learned model LM1 and state information included in the training data. By calculating a success probability p of a plan sequence ($a_1$, $a_2$, $\ldots$, $a_T$) using the first learned model LM1 and the second learned model LM2 generated by the information processing apparatus 1B in accordance with the present example embodiment, it is possible, as evaluation of a control plan with respect to a control target, to evaluate a plan sequence while taking into consideration long-term influence.

Example Application

Figures 19, 20:
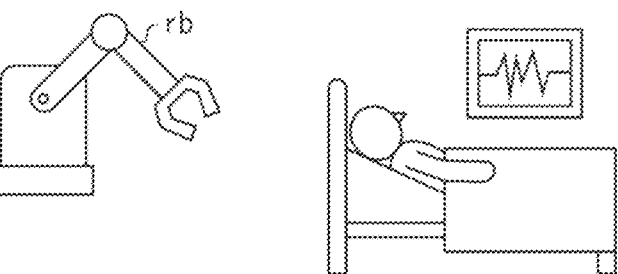
FIG. 19 is a block diagram illustrating a configuration of a computer that functions as the information processing apparatuses in accordance with each of the example embodiments.
FIG. 20 is a diagram schematically illustrating a medical robot using the information processing apparatus in accordance with each of the example embodiments.

An example application using the information processing apparatus 1A or the information processing apparatus 1B will be described with reference to FIG. 20. FIG. 20 is a diagram schematically illustrating a medical robot rb using the information processing apparatus 1A or the information processing apparatus 1B. Note that this example application may be applied to the configuration of the first example embodiment.

The medical robot rb illustrated in FIG. 20 uses a learned model, which has undergone machine learning, to ascertain an environment in an operating room and a physical condition of a patient, tools and procedures necessary for an operation, and the like. The learned model is a model that has undergone machine learning so as to output information (information generated using the success probability, and the like) necessary for an operation, while using state information (an image, sensor information indicating a change in an environment, and the like) as input. The learned model includes, for example, the foregoing first learned model LM1 and second learned model LM2.

For example, the medical robot rb acquires an image from a camera that images an operating room, and acquires sensor information from a sensor that detects a change in an environment of the operating room. Next, the medical robot rb acquires information necessary for an operation by inputting the acquired image and sensor information into a learned model. The medical robot rb ascertains a condition inside the body of the patient in real time based on output of the learned model, and optimizes a procedure and selection of a tool necessary for the operation.

Thus, the medical robot rb using the information processing apparatus 1A (or the information processing apparatus 1B) and the learned model can predict motions of a doctor, a nurse, and the like. Therefore, the medical robot rb can autonomously carry out an optimized operation in cooperation with a doctor, a nurse, and the like.

The medical robot rb using the information processing apparatus 1A and the learned model can accurately recognize a condition of a patient. Therefore, the medical robot rb can carry out an operation with minimum invasion.

[Software Implementation Example]

Some or all of the functions of each of the information processing apparatuses 1, 1A, 1B, 2, and 3 may be implemented by hardware such as an integrated circuit (IC chip), or may be implemented by software.

In the latter case, the information processing apparatuses 1, 1A, 1B, 2, and 3 are implemented by, for example, a computer that executes instructions of a program that is software implementing the foregoing functions. FIG. 19 illustrates an example of such a computer (hereinafter, referred to as "computer C"). The computer C includes at least one processor C1 and at least one memory C2. The memory C2 stores a program P for causing the computer C to operate as the information processing apparatuses 1, 1A, 1B, 2, and 3. The processor C1 of the computer C retrieves the program P from the memory C2 and executes the program P, so that the functions of the information processing apparatuses 1, 1A, 1B, 2, and 3 are implemented.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a computer C-readable, non-transitory, and tangible storage medium M. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communication network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some or all of the foregoing example embodiments can also be described as below. Note, however, that the present invention is not limited to the following supplementary notes.

Supplementary Note 1

An information processing apparatus including: an acquisition means for acquiring state information and a plan sequence, the state information indicating a state of at least one selected from the group consisting of a control target and an environment, and the plan sequence being a time series of control plans with respect to the control target; a generation means for generating a state sequence with use of output obtained by inputting the state information and the plan sequence into a learned model, the state sequence being a time series of pieces of state information each indicating a predicted future state; and a calculation means for calculating, with use of the state sequence, a success probability of the plan sequence which has been acquired by the acquisition means.

Supplementary Note 2

The information processing apparatus according to supplementary note 1, in which: the calculation means calculates, with use of the state sequence and a second learned model which has been generated by machine learning, the success probability of the plan sequence which has been acquired by the acquisition means.

Supplementary Note 3

The information processing apparatus according to supplementary note 2, in which: the calculation means calculates the success probability by inputting, into the second learned model, a last piece of state information included in the state sequence.

Supplementary Note 4

The information processing apparatus according to supplementary note 2, in which: the calculation means calculates a success probability of each of the pieces of state information included in the state sequence by inputting the pieces of state information into the second learned model, and calculates the success probability of the plan sequence based on a statistical result of calculated success probabilities of the respective pieces of state information.

Supplementary Note 5

The information processing apparatus according to supplementary note 2, in which: the calculation means calculates an average vector of state vectors which are pieces of state information included in the state sequence, and calculates the success probability by inputting, into the second learned model, the average vector which has been calculated.

Supplementary Note 6

The information processing apparatus according to any one of supplementary notes 1 through 5, in which: each of the pieces of state information includes information that indicates at least one selected from the group consisting of a feature quantity obtained from an image, a joint angle of a robot arm, and a position and a posture of an object in an image.

Supplementary Note 7

The information processing apparatus according to supplementary notes 1 through 6, in which: each of the control plans includes at least one selected from the group consisting of an action class which has been selected from an action class group including a plurality of action classes, and an input value to a robot joint.

Supplementary Note 8

The information processing apparatus according to supplementary notes 1 through 7, in which: each of the control plans includes information indicating a state of the environment.

Supplementary Note 9

An information processing apparatus including: an acquisition means for acquiring training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and a generation means for generating a learned model by supervised learning using the training data, the learned model outputting a success probability of a plan sequence which is a time series of control plans with respect to a control target.

Supplementary Note 10

An information processing apparatus including: an acquisition means for acquiring training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and a generation means for generating a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

Supplementary Note 11

The information processing apparatus according to supplementary note 9, in which: the learned model outputs the success probability while using, as input, state information included in the state sequence; and the generation means trains the learned model so that a success probability output by the learned model matches a label included in the training data.

Supplementary Note 12

The information processing apparatus according to supplementary note 11, in which: the learned model is a second learned model that outputs the success probability while using, as input, state information included in the state sequence; and the generation means trains a first learned model, which outputs state information indicating a transitioned state of state information while using the state information as input, and the second learned model so that a success probability output by the second learned model matches a label included in the training data while a difference is reduced between state information output by the first learned model and state information included in the training data.

Supplementary Note 13

An information processing method, including: acquiring, by at least one processor, state information and a plan sequence, the state information indicating a state of at least one selected from the group consisting of a control target and an environment, and the plan sequence being a time series of control plans with respect to the control target; generating, by the at least one processor, a state sequence with use of output obtained by inputting the state information and the plan sequence into a learned model, the state sequence being a time series of pieces of state information each indicating a predicted future state; and calculating, by the at least one processor, a success probability of the plan sequence with use of the state sequence.

Supplementary Note 14

An information processing method, including: acquiring, by at least one processor, training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and generating, by the at least one processor, a learned model by supervised learning using the training data, the learned model outputting a success probability of a plan sequence which is a time series of control plans with respect to a control target.

Supplementary Note 15

An information processing method, including: acquiring, by at least one processor, training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and generating, by the at least one processor, a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

Supplementary Note 16

A program for causing a computer to carry out: a process of acquiring state information and a plan sequence, the state information indicating a state of at least one selected from the group consisting of a control target and an environment, and the plan sequence being a time series of control plans with respect to the control target; a process of generating a state sequence with use of output obtained by inputting the state information and the plan sequence into a learned model, the state sequence being a time series of pieces of state information each indicating a predicted future state; and a process of calculating, with use of the state sequence, a success probability of the plan sequence.

Supplementary Note 17

A program for causing a computer to carry out: a process of acquiring training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and a process of generating a learned model by supervised learning using the training data, the learned model outputting a success probability of a plan sequence which is a time series of control plans with respect to a control target.

Supplementary Note 18

A program for causing a computer to carry out: a process of acquiring training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and a process of generating a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

Supplementary Note 19

An information processing apparatus including at least one processor, the at least one processor carrying out: an acquisition process of acquiring state information and a plan sequence, the state information indicating a state of at least one selected from the group consisting of a control target and an environment, and the plan sequence being a time series of control plans with respect to the control target; a generation process of generating a state sequence with use of output obtained by inputting the state information and the plan sequence into a learned model, the state sequence being a time series of pieces of state information each indicating a predicted future state; and a calculation process of calculating, with use of the state sequence, a success probability of the plan sequence which has been acquired in the acquisition process.

Note that the information processing apparatus can further include a memory. The memory can store a program for causing the at least one processor to carry out the acquisition process, the generation process, and the calculation process. The program can be stored in a computer-readable non-transitory tangible storage medium.

Supplementary Note 20

An information processing apparatus including at least one processor, the at least one processor carrying out: an acquisition process of acquiring training data that includes a set of (i) a plan sequence and a state sequence and (ii) a label, the plan sequence being a time series of control plans with respect to a control target, the state sequence being a sequence of pieces of state information each indicating a state of at least one selected from the group consisting of the control target and an environment, the pieces of state information being obtained by carrying out the respective control plans included in the plan sequence, and the label indicating whether or not a task performed by the control target has succeeded by carrying out the control plans included in the plan sequence; and a generation process of generating a learned model by supervised learning using the training data, the learned model outputting a success probability of a plan sequence which is a time series of control plans with respect to a control target.

Note that the information processing apparatus can further include a memory. The memory can store a program for causing the at least one processor to carry out the acquisition process, the generation process, and the calculation process. The program can be stored in a computer-readable non-transitory tangible storage medium.

Supplementary Note 21

An information processing apparatus comprising at least one processor, the at least one processor carrying out: an acquisition process of acquiring training data that includes (i) first state information and a plan sequence and (ii) pieces of second state information, the first state information indicating a state of at least one selected from the group consisting of a first control target and an environment, the plan sequence being a time series of control plans with respect to the first control target, and the pieces of second state information having been obtained by carrying out the respective control plans included in the plan sequence; and a generation process of generating a learned model by supervised learning using the training data, the learned model outputting fourth state information while using, as input, a control plan with respect to a second control target and third state information which indicates a state of at least one selected from the group consisting of the second control target and an environment before the control plan is carried out, the fourth state information indicating a transitioned state of the third state information and being used in a calculation process of calculating a success probability of a plan sequence which is a time series of control plans with respect to the second control target.

Supplementary Note 22

The information processing apparatus according to supplementary note 1, in which: each of the control plans is optimized based on the success probability.

Note that the information processing apparatus can further include a memory. The memory can store a program for causing the at least one processor to carry out the acquisition process and the generation process. The program can be stored in a computer-readable non-transitory tangible storage medium.

REFERENCE SIGNS LIST 1, 1A, 1B, 2, 3: Information processing apparatus
11, 21, 31: Acquisition section
11A: State description section
12, 22, 32: Generation section
12A: Future prediction section
13: Calculation section
13A: Feasibility prediction section
15A: Plan preparation section
16B: First acquisition section
17B: First generation section
18B: Second acquisition section
19B: Second generation section
S1, S2, S3: Information processing method

The invention claimed is:

1. An information processing apparatus for controlling a robot arm, the information processing apparatus comprising at least one processor, the at least one processor configured to:
   acquire state information indicating a state of at least one of the robot arm and an environment obtained from at least one sensor and acquire a plan sequence that is a time series of control plans with respect to the robot arm;
   generate, by inputting the state information and the plan sequence into a first learned model, a state sequence that is a time series of pieces of state information each indicating a predicted future state;
   calculate, using the state sequence, a success probability of the plan sequence, the calculating including computing an average vector of state vectors included in the state sequence and inputting the average vector into a second learned model to output the success probability; and
   based on the success probability and the plan sequence, generate control information including input values to robot joints and output the control information via a communication section to cause the robot arm to execute at least a portion of the plan sequence.

2. The information processing apparatus according to claim 1, wherein:
   each of the pieces of state information includes information indicating at least one of (i) a feature quantity obtained from an image, (ii) a joint angle of the robot arm, and (iii) a position and a posture of an object in the image.

3. The information processing apparatus according to claim 1, wherein:
   each of the control plans includes at least one of (i) an action class selected from an action class group including a plurality of action classes, and (ii) an input value to a robot joint.

4. The information processing apparatus according to claim 1, wherein:
   each of the control plans includes information indicating a state of the environment.

5. The information processing apparatus according to claim 1, wherein:
   each of the control plans is optimized based on the success probability.

6. The information processing apparatus according to claim 1, wherein the control information comprises at least one of a speed, an acceleration, or a torque value for a robot joint.

7. The information processing apparatus according to claim 1, wherein the at least one processor is configured to perform decision making to determine control information comprising at least one of a speed, an acceleration, or a torque value for a robot joint based on the success probability.

8. A method for controlling a robot arm, the method comprising:
   acquiring state information indicating a state of at least one of the robot arm and an environment obtained from at least one sensor and acquiring a plan sequence that is a time series of control plans with respect to the robot arm;
   generating, by inputting the state information and the plan sequence into a first learned model, a state sequence that is a time series of pieces of state information each indicating a predicted future state;

calculating, using the state sequence, a success probability of the plan sequence, the calculating including computing an average vector of state vectors included in the state sequence and inputting the average vector into a second learned model to output the success probability; and based on the success probability and the plan sequence, generating control information including input values to robot joints and outputting the control information via a communication section to cause the robot arm to execute at least a portion of the plan sequence.

9. The method of claim 8, wherein each of the pieces of state information includes at least one of: (i) a feature quantity obtained from an image, (ii) a joint angle of a robot arm, and (iii) a position and a posture of an object in an image.

10. The method of claim 8, wherein each of the control plans includes at least one of: (i) an action class selected from an action class group including a plurality of action classes, and (ii) an input value to a robot joint.

11. The method of claim 8, wherein each of the control plans includes information indicating a state of the environment.

12. The method of claim 8, wherein each of the control plans is optimized based on the success probability.

13. The method of claim 8, wherein the control information comprises at least one of a speed, an acceleration, or a torque value for a robot joint.

14. The method of claim 8, further comprising performing decision making to determine control information comprising at least one of a speed, an acceleration, or a torque value for a robot joint based on the success probability.

15. A non-transitory computer-readable storage medium storing instructions that, when executed by at least one processor, cause a computer to perform a method comprising:

acquiring state information indicating a state of at least one of a robot arm and an environment obtained from at least one sensor and acquiring a plan sequence that is a time series of control plans with respect to the robot arm;

generating, by inputting the state information and the plan sequence into a first learned model, a state sequence that is a time series of pieces of state information each indicating a predicted future state;

calculating, using the state sequence, a success probability of the plan sequence, the calculating including computing an average vector of state vectors included in the state sequence and inputting the average vector into a second learned model to output the success probability; and based on the success probability and the plan sequence, generating control information including input values to robot joints and outputting the control information via a communication section to cause the robot arm to execute at least a portion of the plan sequence.

16. The non-transitory computer-readable storage medium of claim 15, wherein each of the pieces of state information includes at least one of: (i) a feature quantity obtained from an image, (ii) a joint angle of a robot arm, and (iii) a position and a posture of an object in an image.

17. The non-transitory computer-readable storage medium of claim 15, wherein each of the control plans includes at least one of: (i) an action class selected from an action class group including a plurality of action classes, and (ii) an input value to a robot joint.

18. The non-transitory computer-readable storage medium of claim 15, wherein each of the control plans includes information indicating a state of the environment.

19. The non-transitory computer-readable storage medium of claim 15, wherein the control information comprises at least one of a speed, an acceleration, or a torque value for a robot joint.

20. The non-transitory computer-readable storage medium of claim 15, wherein the instructions further cause the computer to perform decision making to determine control information comprising at least one of a speed, an acceleration, or a torque value for a robot joint based on the success probability.

\* \* \* \* \*